US012768457B2

(12) United States Patent
Yoshioka et al.

(10) Patent No.: US 12,768,457 B2
(45) Date of Patent: Oct. 20, 2026

(54) FLOW PATH SWITCHING DEVICE

(71) Applicant: AISAN KOGYO KABUSHIKI KAISHA, Obu (JP)

(72) Inventors: Mamoru Yoshioka, Susono (JP); Kazumasa Nakashima, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 19/145,381

(22) PCT Filed: Nov. 13, 2023

(86) PCT No.: PCT/JP2023/040748
§ 371 (c)(1),
(2) Date: Jul. 2, 2025

(87) PCT Pub. No.: WO2024/171544
PCT Pub. Date: Aug. 22, 2024

(65) Prior Publication Data

US 2026/0218799 A1 Jul. 30, 2026

(30) Foreign Application Priority Data

Feb. 17, 2023 (JP) ................................ 2023-023395

(51) Int. Cl.
*F16K 11/07* (2006.01)
*F16K 11/074* (2006.01)

(52) U.S. Cl.
CPC .................................. *F16K 11/074* (2013.01)

(58) Field of Classification Search
CPC ..................................................... F16K 11/074
See application file for complete search history.

(56) References Cited

U.S. PATENT DOCUMENTS 4,253,640 A * 3/1981 Priese ................... F16K 5/0647
91/189 R
5,285,809 A * 2/1994 Shimoguri .............. F04B 39/16
137/203
(Continued)

FOREIGN PATENT DOCUMENTS

JP H11-44369 A 2/1999
JP 2000-081257 A 3/2000
(Continued)

OTHER PUBLICATIONS

Feb. 6, 2024 Search Report issued in International Patent Application No. PCT/JP2023/040748.
(Continued)

*Primary Examiner* — Paul J Gray
(74) *Attorney, Agent, or Firm* — Oliff PLC

(57) ABSTRACT

A flow path switching device includes a fixed member and a driven member and drives the driven member to switch between combinations of ports of the fixed member and communication paths of the driven member to be communicated to switch a flow path. The flow path switching device has a seal member provided protruding toward the fixed member near the communication path of the driven member to seal a part between the driven member and the fixed member, and a control unit that controls driving of the driven member. When switching the flow path, the control unit performs additional drive control in which the driven member is further driven from a prescribed stop position after switching of the flow path and then performs return drive control in which the driven member is returned toward the prescribed stop position.

6 Claims, 23 Drawing Sheets

(56) References Cited

U.S. PATENT DOCUMENTS

| | | | | |
|---|---|---|---|---|
| 6,234,207 | B1 | 5/2001 | Toyama | |
| 11,174,963 | B2 * | 11/2021 | Anderson | F16K 35/00 |
| 2012/0180890 | A1 | 7/2012 | Kojima et al. | |
| 2014/0083510 | A1 * | 3/2014 | Blieske | F16K 39/06 251/304 |
| 2021/0088148 | A1 * | 3/2021 | Li | F16K 11/0743 |
| 2021/0382018 | A1 | 12/2021 | Otsubo et al. | |
| 2022/0186840 | A1 | 6/2022 | Kimura et al. | |
| 2024/0125398 | A1 | 4/2024 | Ogawa et al. | |

FOREIGN PATENT DOCUMENTS

| | | | |
|---|---|---|---|
| JP | 2007-270863 | A | 10/2007 |
| JP | 2008-261441 | A | 10/2008 |
| JP | 2013-092062 | A | 5/2013 |
| JP | 2013-139833 | A | 7/2013 |
| JP | 2014-047853 | A | 3/2014 |
| JP | 2020-144027 | A | 9/2020 |
| JP | 2021-042809 | A | 3/2021 |
| WO | 2022/172743 | A1 | 8/2022 |

OTHER PUBLICATIONS

Aug. 15, 2025 International Preliminary Report on Patentability issued in International Patent Application No. PCT/JP2023/040748.

Jun. 2, 2026 Office Action issued in Japanese Patent Application No. 2023-023395.

* cited by examiner

FLOW PATH SWITCHING DEVICE

CROSS-REFERENCE TO RELATED APPLICATIONS

This is a US national phase application based on the PCT International Patent Application No. PCT/JP2023/040748 filed on Nov. 13, 2023, and claiming the priority to Japanese Patent Application No. 2023-023395 filed on Feb. 17, 2023, the entire contents of which are incorporated by reference herein.

TECHNICAL FIELD

The disclosure relates to a flow path switching device configured to switch a flow path.

BACKGROUND ART

Patent Document 1 discloses a flow path switching valve in which a rotor seal provided in a rotor slides on a stator when the rotor rotates.

RELATED ART DOCUMENTS

Patent Documents

Patent Document 1: Japanese unexamined patent application publication No. 2020-144027 (JP 2020-144027A)

SUMMARY OF INVENTION

Problems to be Solved by the Invention

In the flow path switching valve disclosed in Patent Document 1, when the rotor seal is dragged and deformed by the surface of the stator as the rotor rotates, the sealing performance of the rotor seal may deteriorate.

The disclosure has been made to address the above problems and has a purpose to provide a flow path switching device capable of ensuring the sealing performance of a seal member.

Means of Solving the Problems (1) To achieve the foregoing purpose, one aspect of the present disclosure provides a flow path switching device comprising: a fixed member; and a driven member, the flow path switching device being configured to switch between combinations of ports of the fixed member and communication paths of the driven member to be communicated by driving the driven member to switch a flow path, wherein the flow path switching device comprises: a seal member provided around the communication paths of the driven member and protruding toward the fixed member to seal between the driven member and the fixed member; and a control unit that controls driving of the driven member, wherein, when switching the flow path, the control unit performs an additional drive control to further drive the driven member from a predetermined stop position after switching the flow path, and then performs a return drive control to return the driven member toward the predetermined stop position.

According to this aspect, even when the seal member is deformed by sliding on the fixed member during switching of the flow path, it is possible to prevent the leading end of the seal member from protruding into the port of the fixed member by performing the additional drive control. This can ensure the sealing performance of the seal member.

Further, since deformation of the seal member is eliminated by performing the return drive control, it is possible to reduce the local concentration of compressive stress and tensile stress in the seal member and reduce changes in surface pressure of the seal part. This can avoid that the collapse of the seal member is hastened and the sealing performance becomes poor due to changes in surface pressure of the seal part.

In the above-described configuration, preferably, a drive amount of the driven member to perform the additional drive control and a drive amount of the driven member to perform the return drive control are changed according to a temperature of a fluid.

According to this aspect, even when the elastic state of the seal member changes due to the fluid temperature, it is possible to avoid the leading end of the seal member from protruding into the port of the fixed member after switching of the flow path is completed. Thus, the sealing performance of the seal member can be ensured.

In the above-described configuration, preferably, the control unit repeats the additional drive control and the return drive control multiple times to switch the flow path.

According to this aspect, since the deformation of the seal member is more effectively eliminated, it is possible to reduce the local concentration of compressive stress and tensile stress in the seal member and reduce changes in surface pressure of the seal part.

In the above-described configuration, preferably, when there is a control stop request, the control unit sets the combination of the ports of the fixed member and the communication paths of the driven member to a state requested under a low temperature environment, and then stops controlling the driven member.

According to this aspect, when the control stop request is eliminated, there is no need to switch the flow path under the low temperature environment. Thus, the sealing performance of the seal member can be maintained.

Effects of the Invention

The flow path switching device of the disclosure can ensure the sealing performance of the seal member.

MODE FOR CARRYING OUT THE INVENTION

A flow path switching device 1, which is one example of an embodiment of the disclosure, will now be described in detail below.

<Brief Description of Entirety of Flow Path Switching Device>

The entirety of the flow path switching device 1 in the embodiment will be briefly described first.

Figure 1:
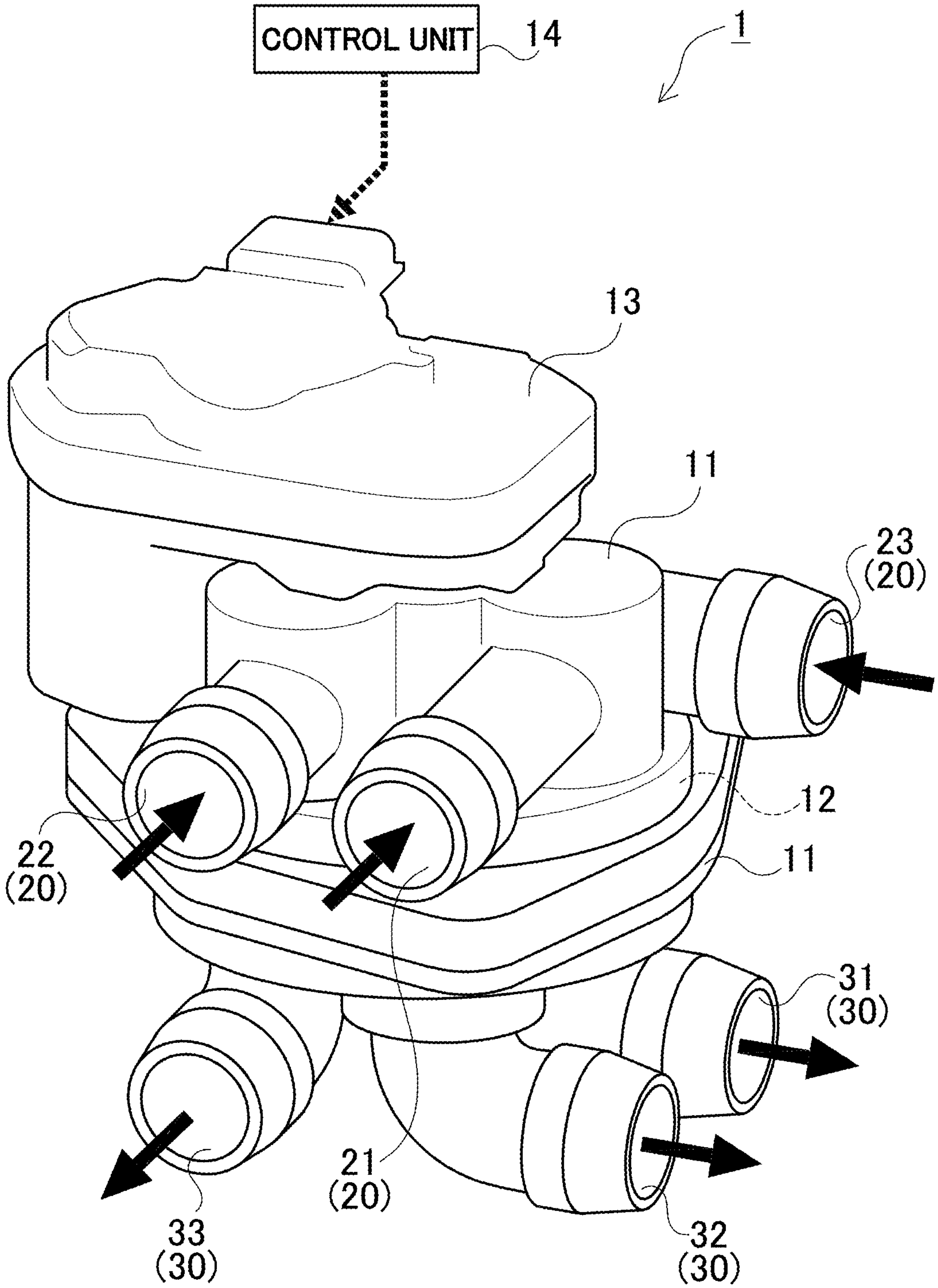
FIG. 1 is a perspective external view of a flow path switching device (which is embodied as a six-way valve) in an embodiment.
Figure 2:
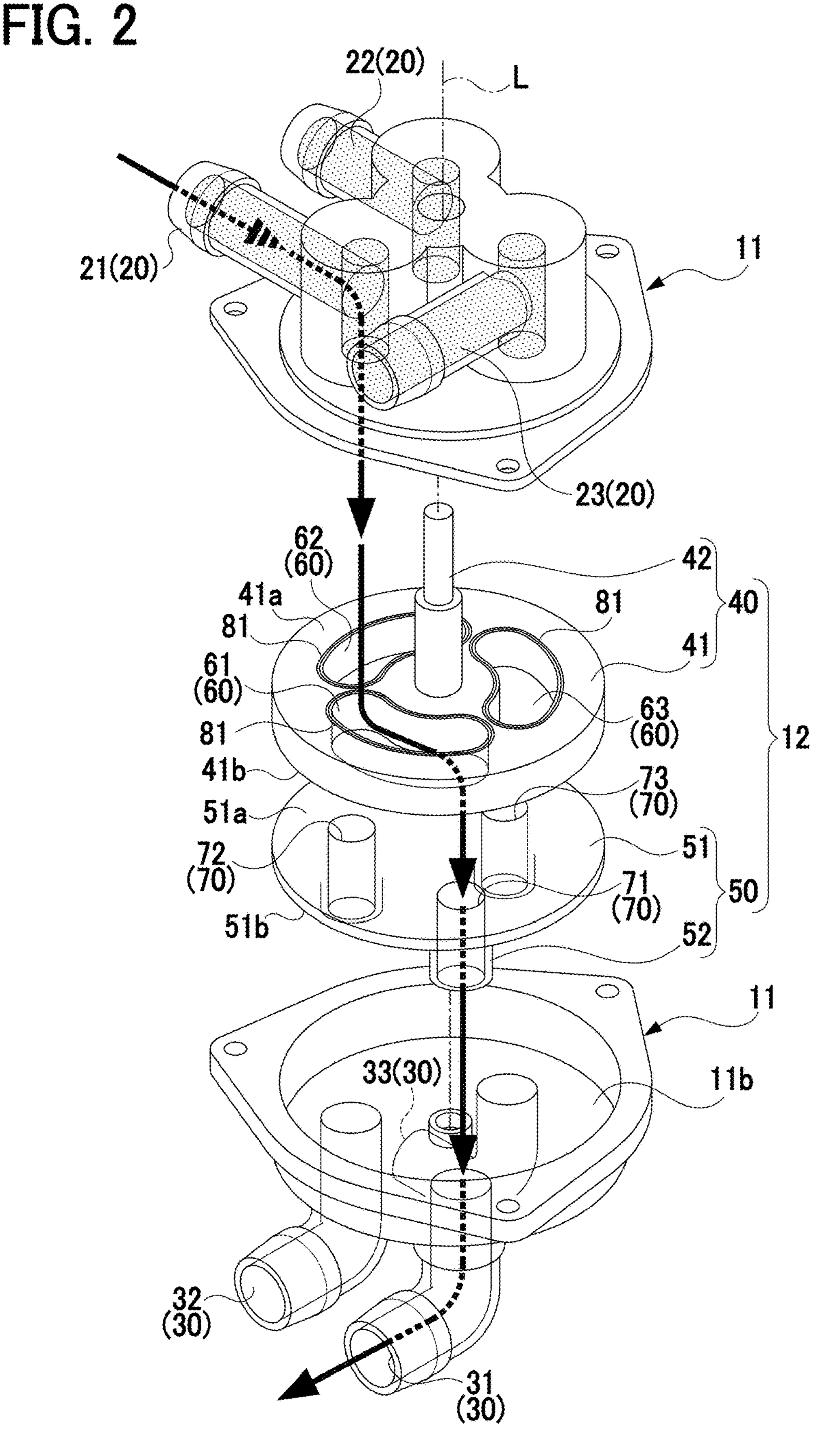
FIG. 2 is an exploded perspective view of the flow path switching device in the embodiment, from which a drive unit and a control unit are omitted.
Figure 3:
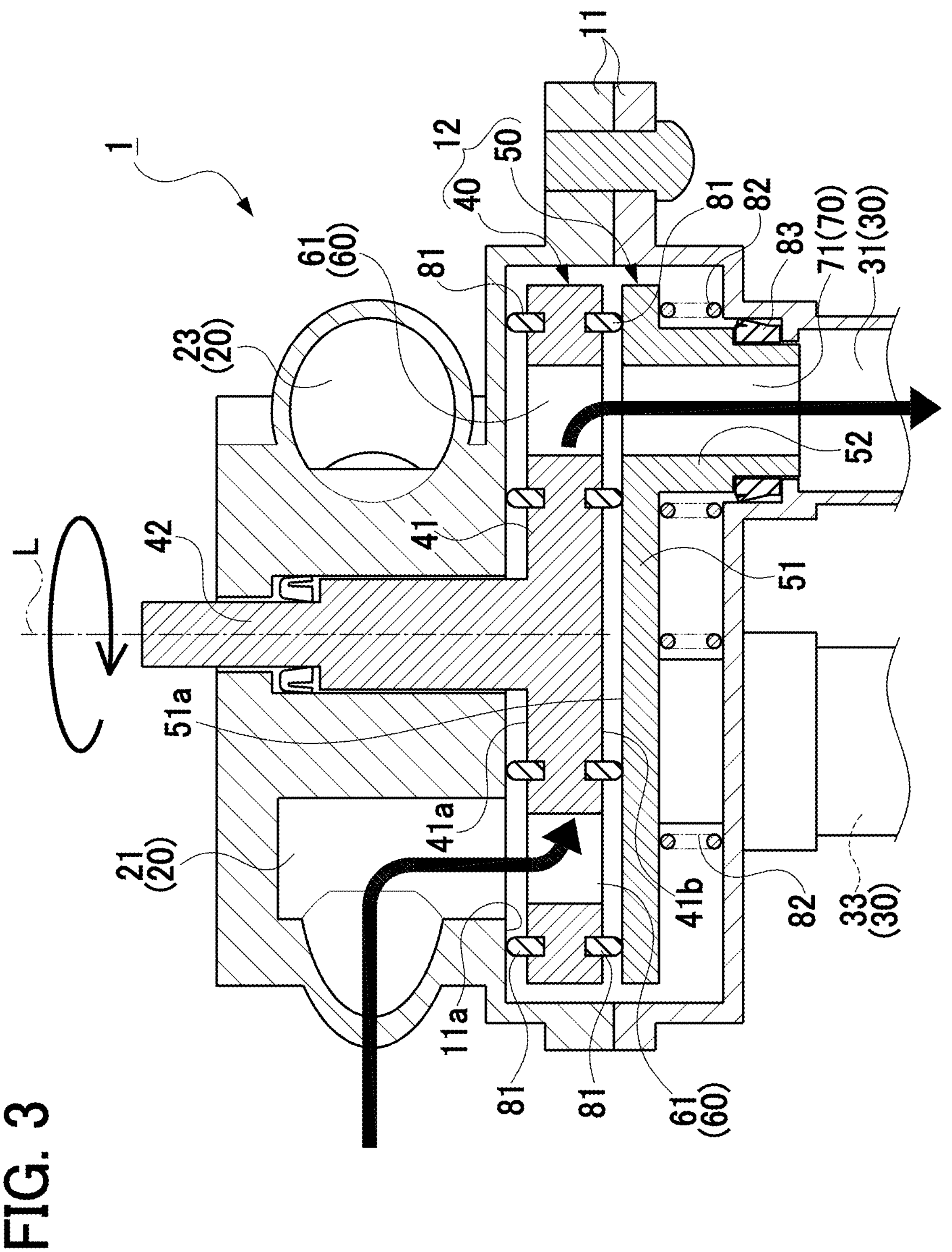
FIG. 3 is a cross-sectional view of the flow path switching device in the embodiment, from which with drive unit and the control unit are omitted.

As shown in FIG. 1 to FIG. 3, the flow path switching device 1 has a housing 11, a valve body unit 12, a drive unit 13, and a control unit 14.

The housing 11 is provided with inflow paths 20 in which a fluid (e.g., water) flows and outflow paths 30 from which the fluid flows out. Here, the flow path switching device 1 is a six-way valve as one example, and the housing 11 is provided with three inflow paths 20 and three outflow paths 30. As the three inflow paths 20, a first inflow path 21, a second inflow path 22, and a third inflow path 23 are provided. Further, as the three outflow paths 30, a first outflow path 31, a second outflow path 32, and a third outflow path 33 are provided.

The housing 11 is made of, for example, resin. The housing 11 is one example of a "fixed member" of the disclosure, and the inflow paths 20 (i.e., the first inflow path 21, second inflow path 22, and third inflow path 23) are one example of a "port" of the disclosure.

The valve body unit 12 is installed inside the housing 11. This valve body unit 12 is provided with a plate-like, rotatable rotary disk 40 and a plate-like fixed disk 50, as shown in FIG. 2 and FIG. 3. The rotary disk 40 and the fixed disk 50 are stacked in place in the direction of the central axis L of a circular plate part 41 of the rotary disk 40 and a circular plate part 51 of the fixed disk 50, which will be mentioned later (hereinafter, this direction will be simply referred to as an "axial direction").

The rotary disk 40 and the fixed disk 50 are made of, for example, resin. The rotary disk 40 is one example of a "driven member" of the disclosure and the fixed disk 50 is one example of the "fixed member" of the disclosure.

Figure 4:
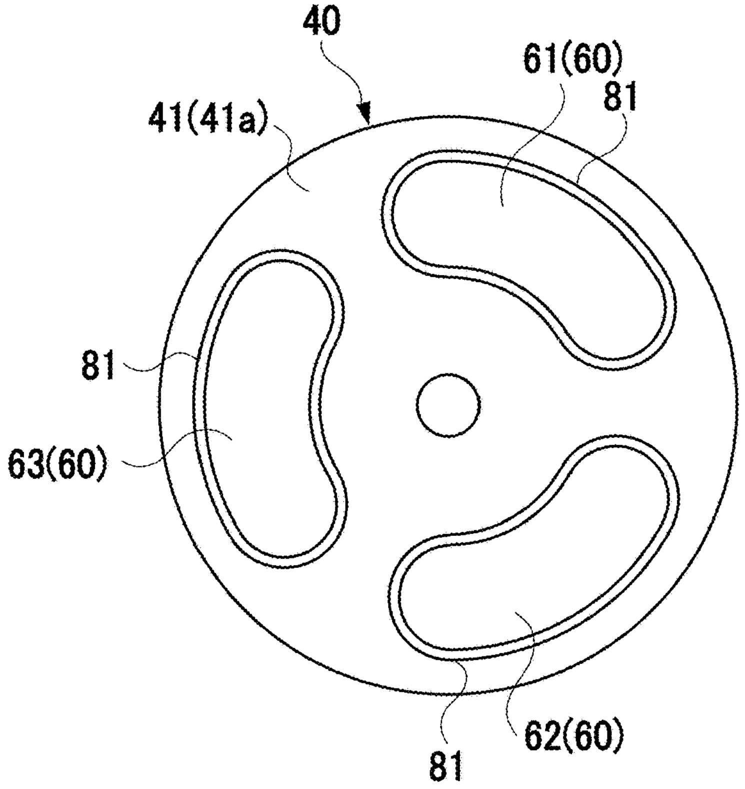
FIG. 4 is a top view of a rotary disk.

As shown in FIG. 2 to FIG. 4, the rotary disk 40 is placed between the housing 11 and the fixed disk 50, and clamped between the housing 11 and the fixed disk 50 under the action of stress due to the pressing force of disk holding springs 82 mentioned later, via the fixed disk 50 and seal members 81 mentioned later. This rotary disk 40 includes the circular plate part 41 and a rotary shaft 42.

The circular plate part 41 is formed in a circular disk shape and provided with rotary-disk communication paths 60. The rotary-disk communication paths 60 penetrate through the circular plate part 41 in the axial direction and can communicate with the inflow paths 20 and fixed-disk ports 70 mentioned later. Herein, the circular plate part 41 is provided with three rotary-disk communication paths 60. As shown in FIG. 2 and FIG. 4, as the three rotary-disk communication paths 60, a first rotary-disk communication path 61, a second rotary-disk communication path 62, and a third rotary-disk communication path 63 are provided. The rotary-disk communication paths 60 (i.e., the first rotary-disk communication path 61, second rotary-disk communication path 62, and third rotary-disk communication path 63) are one example of a "communication path" of the disclosure.

The rotary shaft 42 is connected at its one end with the circular plate part 41 and at the other end with the drive unit 13 in the central axis direction. This rotary shaft 42 is located at the center position of the circular plate part 41 so that the central axis of the rotary shaft 42 coincides with the central axis L of the circular plate part 41. When the rotary shaft 42 is rotated about its central axis upon receipt of the rotative power from the drive unit 13, the circular plate part 41 connected to the rotary shaft 42 is rotated about the central axis L. In this manner, the rotary disk 40 rotates about the central axis L when obtaining the rotative power from the drive unit 13.

Figure 5:
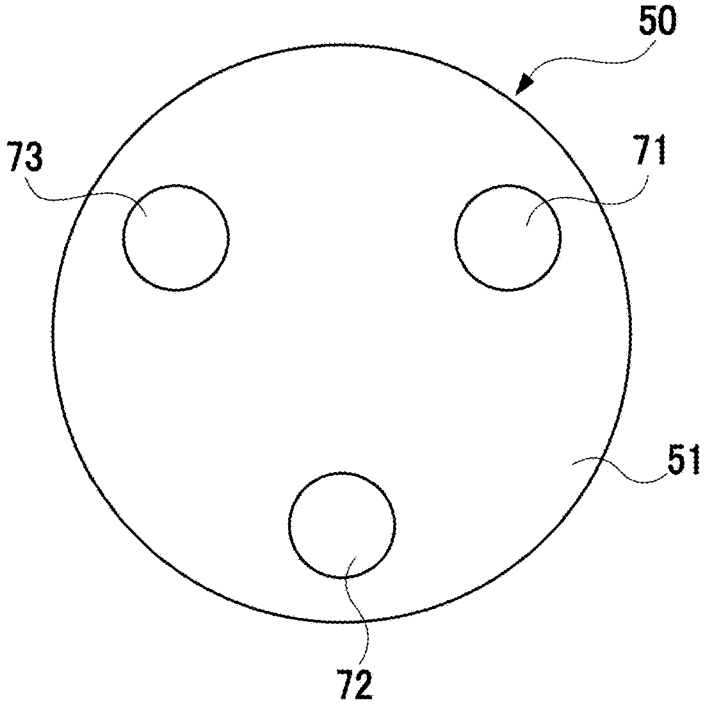
FIG. 5 is a top view of a fixed disk.

As shown in FIG. 2, FIG. 3, and FIG. 5, the fixed disk 50 is provided with the circular plate part 51 and cylindrical parts 52.

The circular plate part 51 is formed in a circular disk shape and provided with the fixed-disk ports 70 penetrating through the circular plate part 51 in the axial direction. Herein, the circular plate part 51 is provided with three fixed-disk ports 70. As the three fixed-disk ports 70, as shown in FIG. 2 and FIG. 5, a first fixed-disk port 71, a second fixed-disk port 72, and a third fixed-disk port 73 are provided. The fixed-disk ports 70 (i.e., the first fixed-disk port 71, second fixed-disk port 72, and third fixed-disk port 73) are one example of a "port" of the disclosure.

The cylindrical parts 52 are connected to the circular plate part 51 and formed extending from the circular plate part 51 in the axial direction and surrounding the fixed-disk ports 70. Herein, three cylindrical parts 52 are arranged in one-to-one correspondence with the three fixed-disk ports 70.

The drive unit 13 is provided with a motor (not shown) to supply power to the rotary shaft 42 of the rotary disk 40.

The control unit 14 includes memories, such as a CPU, a ROM, a RAM, etc. and controls the flow path switching device 1 (e.g., the rotation of the rotary disk 40) according to a program stored in advance in the memories.

In the flow path switching device 1 configured as above, flow paths through which a fluid flows are formed by allowing communication between the inflow paths 20, the rotary-disk communication paths 60, and the fixed-disk ports 70 (the outflow paths 30). In the flow path switching device 1, the rotary disk 40 is rotationally driven by the drive unit 13 to switch between combinations of the inflow paths 20 and the fixed-disk ports 70 with the rotary-disk communication paths 60 to be communicated, thereby switching between the flow path patterns for flowing the fluid.

Figure 6:
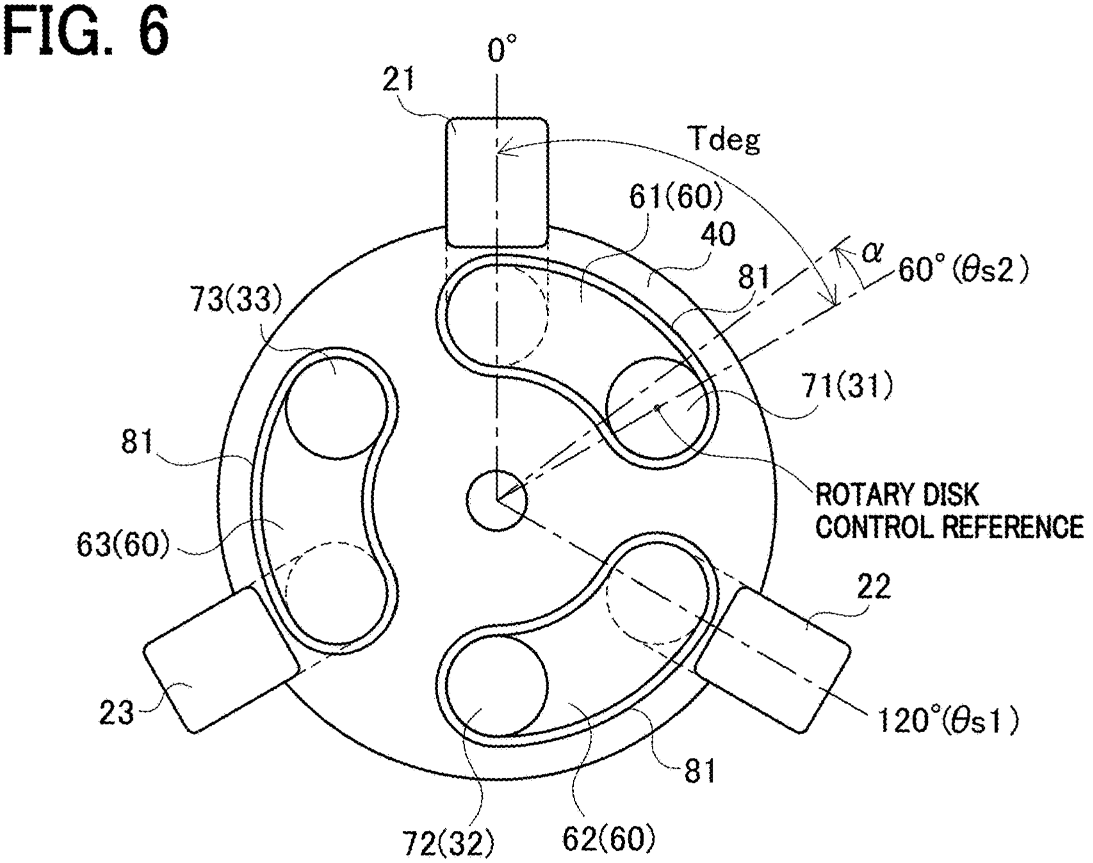
FIG. 6 is a diagram schematically showing a flow path pattern A, which is an image diagram representing the flow path switching device viewed from above.

For example, as shown in FIG. 6, in a flow path pattern A, which is a first flow path pattern, the three rotary-disk communication paths 60 (i.e., the first rotary-disk communication path 61, second rotary-disk communication path 62, and third rotary-disk communication path 63) provide communication between the first inflow path 21 and the first fixed-disk port 71 (the first outflow path 31), communication between the second inflow path 22 and the second fixed-disk port 72 (the second outflow path 32), and communication between the third inflow path 23 and the third fixed-disk port 73 (the third outflow path 33).

Figure 7:
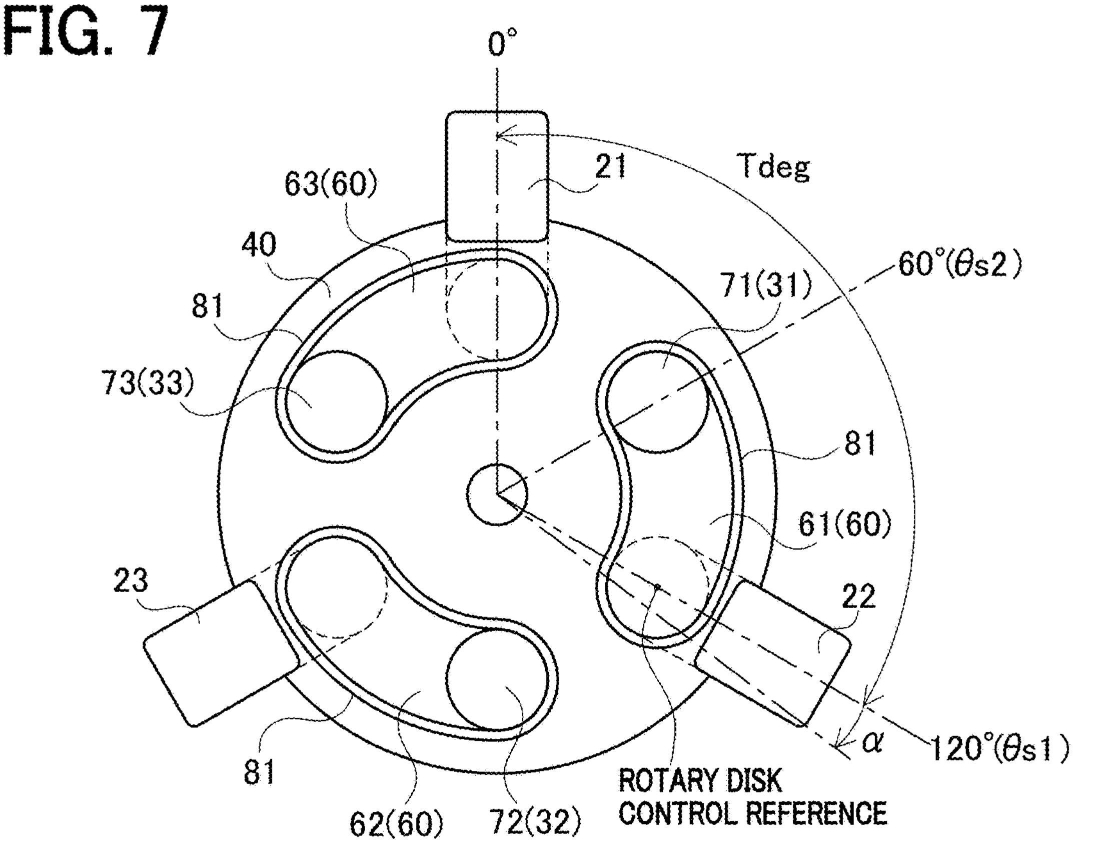
FIG. 7 is a diagram schematically showing a flow path pattern B, which is an image diagram representing the flow path switching device viewed from above.

Further, when the rotary disk 40 is rotated clockwise by the drive unit 13, the flow path pattern A shown in FIG. 6 can be switched to a flow path pattern B shown in FIG. 7.

Specifically, as shown in FIG. 7, in the flow path pattern B, which is a second flow path pattern, the three rotary-disk communication paths 60 provide communication between the first inflow path 21 and the third fixed-disk port 73 (the third outflow path 33), communication between the second inflow path 22 and the first fixed-disk port 71 (the first outflow path 31), and communication between the third inflow path 23 and the second fixed-disk port 72 (the second outflow path 32).

Further, when the rotary disk 40 is rotated counterclockwise by the drive unit 13, the flow path pattern B shown in FIG. 7 can be switched to the flow path pattern A shown in FIG. 6.

The flow path switching device 1 is not limited to the six-way valve, and may be another multiple-way valve, such as a three-way valve, a four-way valve, and an eight-way valve.

In the present embodiment, elastic members are each provided between the housing 11 and the rotary disk 40, between the rotary disk 40 and the fixed disk 50, and between the fixed disk 50 and the housing 11, in the axial direction.

Concretely, as shown in FIG. 3, the seal members 81 are placed as the elastic members respectively between the housing 11 and the rotary disk 40 and between the rotary disk 40 and the fixed disk 50. Those seal members 81 are components that respectively close (i.e., seal) between the housing 11 and the rotary disk 40 and between the rotary disk 40 and the fixed disk 50.

The seal members 81 are circumferentially provided in an upper surface 41*a* and a lower surface 41*b* of the circular plate part 41 of the rotary disk 40 so as to surround the corresponding rotary-disk communication paths 60 each formed in a long hole, as shown in FIG. 2 to FIG. 4, and others. The seal members 81 provided in the upper surface 41*a* of the circular plate part 41 protrude toward the housing 11 and contact with the inner surface 11*a* of the housing 11 to seal the flow paths formed between the inflow paths 20 and the rotary-disk communication paths 60 communicating with the inflow paths 20. Further, the seal members 81 provided in the lower surface 41*b* of the circular plate part 41 protrude toward the fixed disk 50 and contact with the upper surface 51*a* of the circular plate part 51 of the fixed disk 50 to seal the flow paths formed between the fixed-disk ports 70 and the rotary-disk communication paths 60 communicating with the fixed-disk ports 70.

The seal members 81 are made of, for example, fluorine resin (e.g., Teflon (registered trademark)). The seal members 81 may be made of rubber coated with fluorine resin. Furthermore, the seal members 81 may be made of another material other than fluorine resin and rubber.

The disk holding springs 82 are provided as the elastic members between the circular plate part 51 of the fixed disk 50 and the housing 11. The stress by the pressing force of the disk holding springs 82 acts on the circular plate part 51 of the fixed disk 50.

Further, lip seals 83 are each provided between one of the cylindrical parts 52 of the fixed disk 50 and the housing 11 to ensure the sealing performance of the corresponding fixed-disk ports 70.

<Control for Switching Flow Path>

Next, the control for switching the flow path will be described below.

Figure 24:
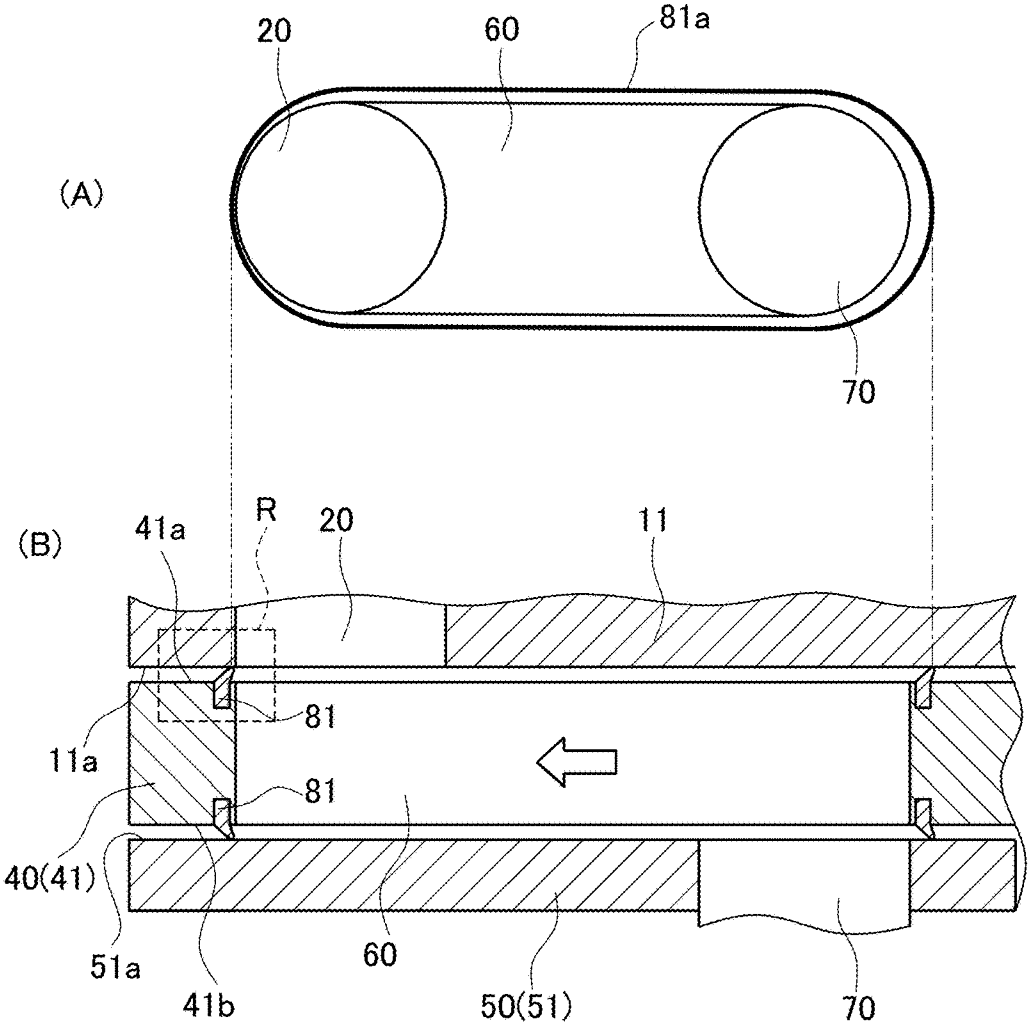
FIG. 24 is a diagram showing issues in a conventional art.
Figure 25:
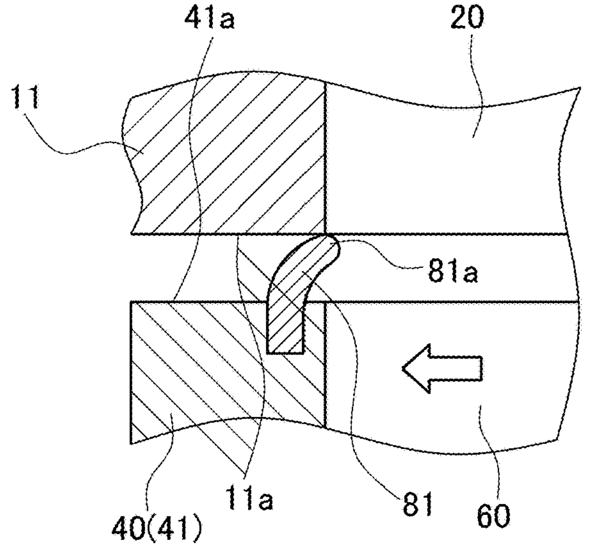
FIG. 25 is an enlarged view of the seal member in FIG. 24 and its surrounding (a region R in FIG. 24(B)).

As shown in FIG. 24, when the rotary disk 40 is rotated (i.e., driven in a direction indicated by an arrow in FIG. 24 (B)) to switch a flow path, the leading end 81*a* of the seal member 81 (see FIG. 25) slides on the inner surface 11*a* of the housing 11 (or the upper surface 51*a* of the fixed disk 50) and receives sliding resistance from the inner surface 11*a* (or the upper surface 51*a* of the fixed disk 50). Then, the seal member 81 that is an elastic body is deformed as shown in FIG. 25, and the leading end 81*a* of the seal member 81 may protrude into the inflow path 20 after the rotary disk 40 is stopped upon completion of switching of the flow path. Thus, the sealing performance of the seal member 81 may deteriorate.

Further, compressive stress and tensile stress locally concentrate in the seal member 81, accelerating the collapse of the seal member 81 or deteriorating the sealing performance of a seal part (i.e., a contact area of the seal member 81 with the inner surface 11*a* of the housing 11) due to changes in surface pressure thereof.

Although FIG. 25 illustrates the seal member 81 provided in the upper surface 41*a* of the rotary disk 40, the seal member 81 provided in the lower surface 41*b* of the rotary disk 40 also slides on the upper surface 51*a* of the fixed disk 50 and therefore it may cause similar defects that the collapse of the seal member 81 is hastened and the sealing performance of the seal member 81 becomes poor due to changes in surface pressure of the seal part (i.e., a contact area between the seal member 81 and the upper surface 51*a* of the fixed disk 50).

In the embodiment, therefore, the following controls are performed to ensure the sealing performance of the seal members 81 and further avoid that the collapse of the seal member 81 is hastened and the sealing performance becomes poor due to changes in surface pressure of the seal part.

First Example

A first example will be described first.

In this example, when switching a flow path, the control unit 14 performs an overrun control OC to further additionally rotate the rotary disk 40 from a predetermined stop angle θs (e.g., θs1, θs2), which is the originally intended position at which the rotary disk 40 is to be stopped after switching the flow path. Then, the control unit 14 performs a return drive control RC to return the rotary disk 40 by reversely rotating the rotary disk 40 toward the predetermined stop angle θs. The overrun control OC is one example of an "additional drive control" of the disclosure and the predetermined stop angle θs is one example of a "predetermined stop position" of the disclosure.

Figure 8:
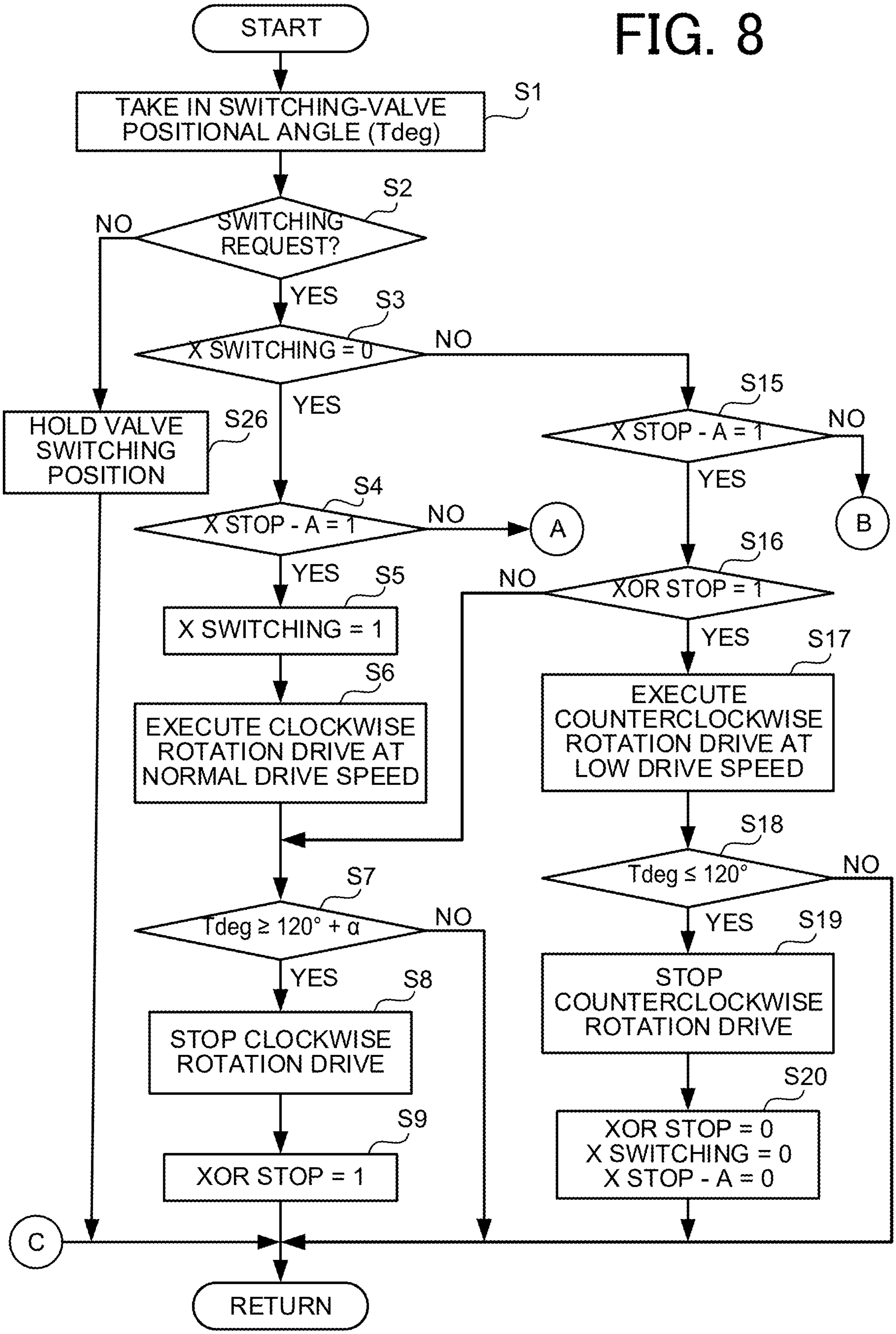
FIG. 8 is a flowchart showing control contents performed in a first example.
Figure 9:
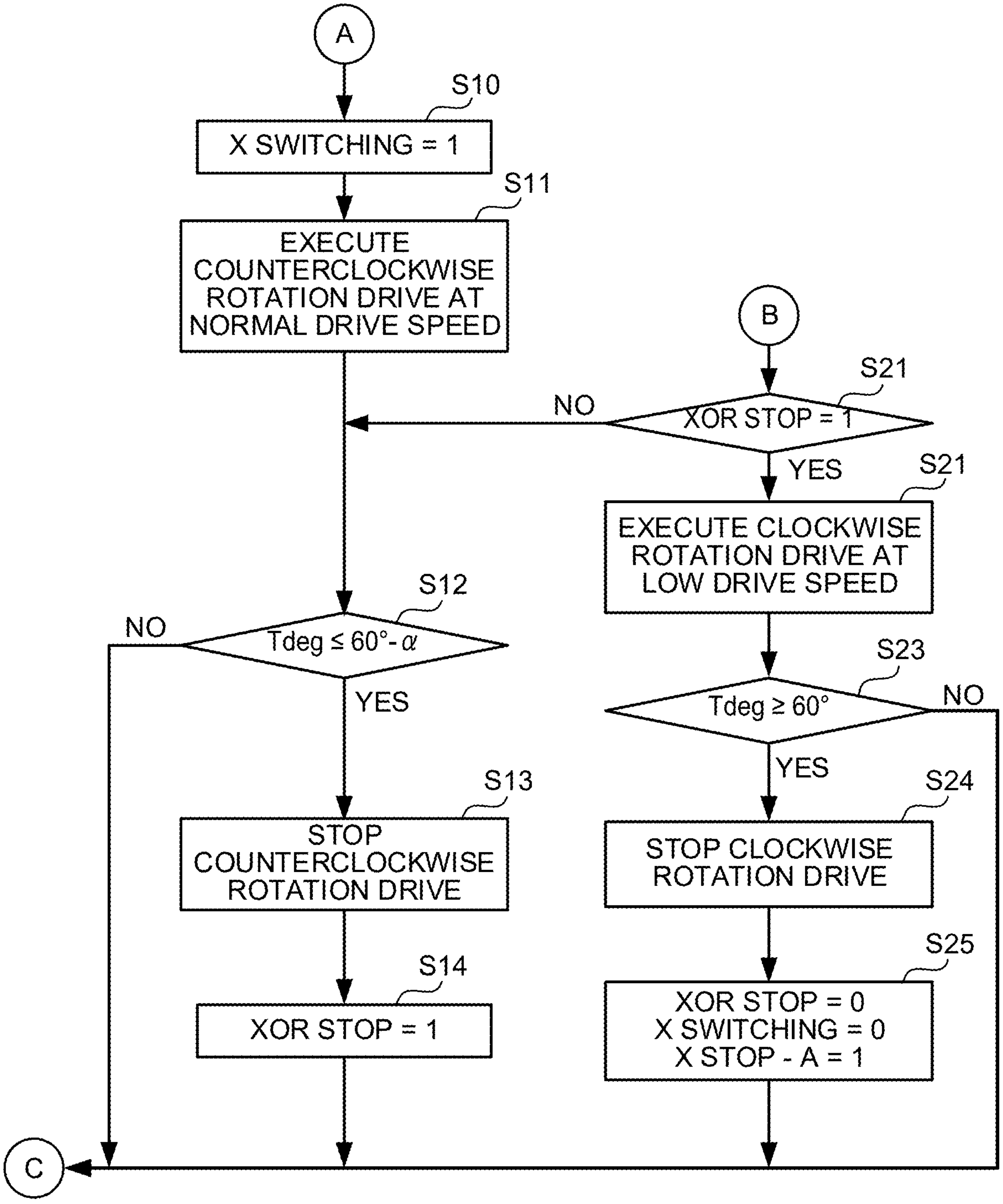
FIG. 9 is a flowchart showing the control contents performed in the first example.

Concretely, the control unit 14 executes the control shown in FIG. 8 and FIG. 9. In the control shown in FIG. 8 and FIG. 9, assuming that the rotation angle (i.e., a drive amount) of the rotary disk 40 during execution of the overrun control OC is an overrun drive angle α, and the rotation angle of the rotary disk 40 during the return drive control RC is a return drive angle β, their relationship is: the overrun drive angle α=the return drive angle β.

As shown in FIG. 8, the control unit 14 takes in a switching-valve positional angle Tdeg (Step S1) and determines whether or not there is a request of switching (of a flow path) (Step S2).

The switching-valve positional angle Tdeg is a current rotation angle of the rotary disk 40 and specifically an angle from the position, which is a reference angle of 0°, to a reference position to which the rotary disk is controlled, namely, a rotary-disk control reference position, as shown in FIG. 6 and FIG. 7. Further, the rotary disk control reference position is set, for example, at the position of the first rotary-disk communication path 61 as shown in FIG. 6, and more specifically, at the center position of the first fixed-disk port 71 in the first rotary-disk communication path 61 in the flow path pattern A and the center position of the second inflow path 22 in the flow path pattern B. Further, the switching-valve positional angle Tdeg is detected, for example, based on detection values of an actuator opening sensor installed in the drive unit 13.

When the switching request is received (Step S2: YES), if a "switching-state determination flag" is 0 (Step S3: YES) and a "stop—pattern-A determination flag" is 1 (Step S4: YES), the control unit 14 turns a "switching-state determination flag" to 1 (Step S5).

The switching-state determination flag will be represented simply as a "switching flag" in the following description and expressed as "X switching" in FIG. 8 and FIG. 9. This switching flag is set to 0 when switching of the flow path is not performed, and it is set to 1 when switching of the flow path is in process.

The "stop—pattern-A determination flag" will be hereinafter represented simply as a "stop—A flag" in the following description and expressed as "X stop—A" in FIG. 8 and FIG. 9. This "stop-A flag" is set to 0 when the rotary disk 40 is stopped in the flow path pattern B or set to 1 when the rotary disk 40 is stopped in the flow path pattern A.

Next, the control unit 14 executes a clockwise rotation drive at a normal drive speed (Step S6), that is, rotates the rotary disk 40 clockwise at the normal drive speed to switch the flow path from the flow path pattern A shown in FIG. 6 to the flow path pattern B shown in FIG. 7.

The control unit 14 then determines whether or not the switching-valve positional angle Tdeg is equal to or larger than (120°+α) (Step S7). The overrun drive angle α is, for example, 0.5° to 2°.

When the switching-valve positional angle Tdeg is less than (120°+α) (Step S7: NO), the control unit 14 continues the clockwise rotation drive.

In contrast, when the switching-valve positional angle Tdeg is equal to or larger than (120°+α) (Step S7: YES), the control unit 14 stops the clockwise rotation drive (Step S8), and sets an overrun stop completion determination flag to 1 (Step S9). In this way, the control unit 14 further rotates the rotary disk 40 clockwise by an overrun drive angle α from the predetermined stop angle θs1 (e.g., 120°) and completes the overrun control OC.

The "overrun stop completion determination flag" will be represented simply as an "OR stop flag" in the following description and expressed as "XOR stop" in FIG. 8 and FIG. 9. This OR stop flag is set to 0 when the overrun control OC is not completed, but set to 1 when the overrun control OC is completed.

In Step S4, when the "stop—A flag" is 0 (Step S4: NO), the control unit 14 turns the switching flag to 1 (Step S10) as shown in FIG. 9.

The control unit 14 then executes a counterclockwise rotation drive at a normal drive speed (Step S11), that is, rotates the rotary disk 40 counterclockwise at the normal drive speed to switch the flow path from the flow path pattern B shown in FIG. 7 to the flow path pattern A shown in FIG. 6.

The control unit 14 then determines whether or not the switching-valve positional angle Tdeg is equal to or less than (60°−α) (Step S12).

When the switching-valve positional angle Tdeg is larger than (60°−α) (Step S12: NO), the control unit 14 continues the counterclockwise rotation drive.

In contrast, when the switching-valve positional angle Tdeg is equal to or less than (60°−α) (Step S12: YES), the control unit 14 stops the counterclockwise rotation drive (Step S13) and turns the OR stop flag to 1 (Step S14). In this way, the control unit 14 further rotates the rotary disk 40 counterclockwise by the overrun drive angle α from the predetermined stop angle θs2 (e.g., 60°) and completes the overrun control OC.

As shown in FIG. 8, when the switching flag is 1 in step S3 (Step S3: NO), and when the "stop—A flag" is 1 (Step S15: YES) and the OR stop flag is 1 (Step S16: YES), the control unit 14 executes the counterclockwise rotation drive at a low drive speed (Step S17). As above, the control unit 14 rotates the rotary disk 40 clockwise at the normal drive speed to complete the overrun control OC and then rotates the rotary disk 40 counterclockwise at the low drive speed to perform the return drive control RC. The low drive speed is slower than the normal drive speed.

Next, the control unit 14 determines whether or not the switching-valve positional angle Tdeg is equal to or less than 120° (Step S18).

When the switching-valve positional angle Tdeg is larger than 120° (Step S18: NO), the control unit 14 continues the counterclockwise rotation drive.

In contrast, when the switching-valve positional angle Tdeg is equal to or less than 120° (Step S18: YES), the control unit 14 stops the counterclockwise rotation drive (Step S19), and turns all of the OR stop flag, the switching flag, and the "stop—A flag" to 0 (Step S20). In this way, the control unit 14 rotates the rotary disk 40 counterclockwise to return to the predetermined stop angle θs1 (e.g., 120°) and completes the return drive control RC.

When the OR stop flag is 0 in step S16 (Step S16: NO), the control unit 14 performs the control in step S7.

When the "stop—A flag" is 0 in step S15 (Step S15: NO), and when the OR stop flag is 1 (Step S21: YES), the control unit 14 executes the clockwise rotation drive at the low speed drive speed (Step S22). In this way, the control unit 14 rotates the rotary disk 40 counterclockwise at the normal drive speed to complete the overrun control OC, and then rotates the rotary disk 40 clockwise at the low drive speed to perform the return drive control RC.

Next, the control unit 14 determines whether or not the switching-valve positional angle Tdeg is equal to or larger than 60° (Step S23).

When the switching-valve positional angle Tdeg is less than 60° (Step S23: NO), the control unit 14 continues the clockwise rotation drive.

In contrast, when the switching-valve positional angle Tdeg is equal to or larger than 60° (Step S23: YES), the control unit 14 stops the clockwise rotation drive (Step S24), turns the OR stop flag and the switching flag to 0 and turns the "stop—A flag" to 1 (Step S25). In this way, the control unit 14 rotates the rotary disk 40 clockwise to return to the predetermined stop angle θs2 (e.g., 60°) and completes the return drive control RC.

When the OR stop flag is 0 in step S21 (Step S21: NO), the control unit 14 performs the control in step S12.

When the switching request is absent in step S2 (Step S2: NO), the control unit 14 holds a valve switching position (Step S26), that is, maintains the switching-valve positional angle Tdeg.

Figure 10:
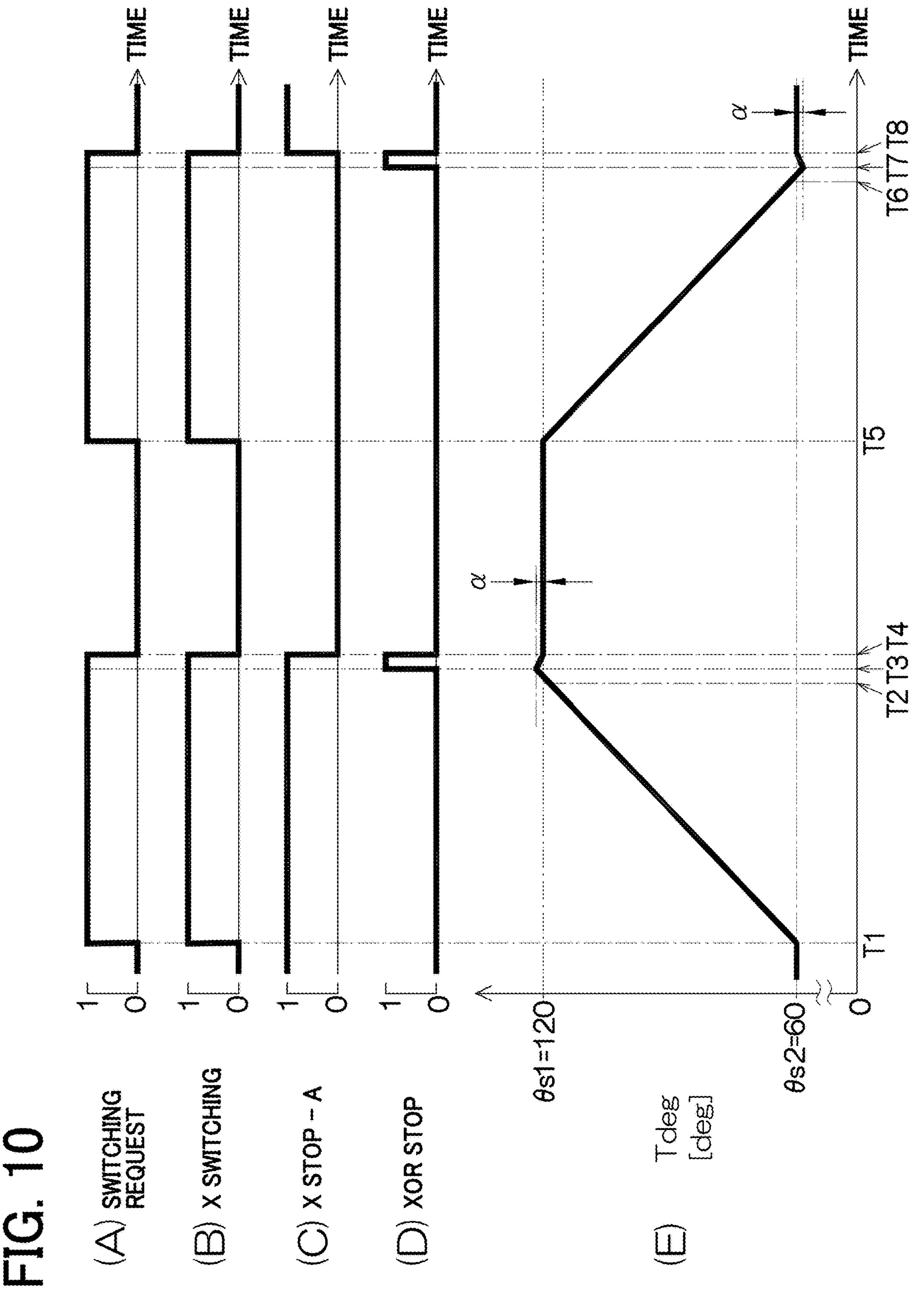
FIG. 10 is a time chart showing the control contents performed in the first example.
Figure 11:
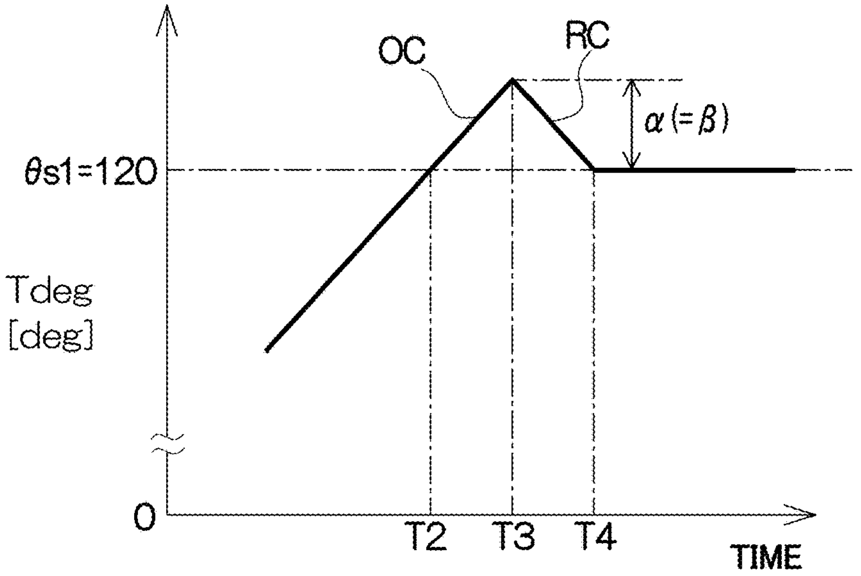
FIG. 11 is an enlarged diagram showing a return drive control of an overrun control in FIG. 10.

When the above-described control based on the flowcharts shown in FIG. 8 and FIG. 9 is executed, for example, the control expressed by time charts shown in FIG. 10 and FIG. 11 is carried out.

As shown in FIG. 10, at time T1, switching from the flow path pattern A to the flow path pattern B is requested and the switching flag is turned to 1. Then, as the rotary disk 40 rotates clockwise, the switching-valve positional angle Tdeg begins to increase.

Thereafter, as shown in FIG. 10 and FIG. 11, the overrun control OC is performed from time T2 to time T3, the return drive control RC is performed from time T3 to time T4, and the switching of the flow path from the flow path pattern A to the flow path pattern B is completed at time T4.

Thereafter, at time T5, switching from the flow path pattern B to the flow path pattern A is requested and the switching flag is turned to 1. When, as the rotary disk 40 rotates counterclockwise, the switching-valve positional angle Tdeg begins to decrease.

Subsequently, the overrun control OC is performed from time T6 to time T7, the return drive control RC is performed from time T7 to time T8, and the switching of the flow path from the flow path pattern B to the flow path pattern A is completed at time T8.

In the present example, as described above, when switching the flow path, the control unit 14 performs the overrun control OC to further rotate the rotary disk 40 from the predetermined stop angle θs after switching the flow path.

Figure 12:
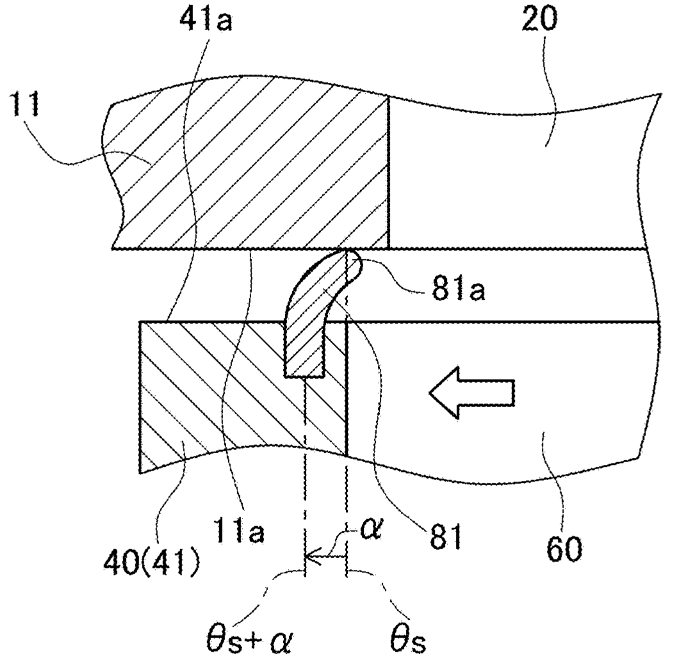
FIG. 12 is a cross-sectional view of a seal member and its surrounding after the overrun control is performed.

As shown in FIG. 12, as described above, the control unit 14 additionally rotates the rotary disk 40 from the original stop angle θs, at which the flow path switching is completed, to overrun to the position (θs+α).

Consequently, even if the leading end 81*a* of the seal member 81 provided in the upper surface 41*a* of the rotary disk 40 is deformed upon receipt of the sliding resistance from the inner surface 11*a* of the housing 11, it is possible to avoid the leading end 81*a* from protruding into the inflow path 20. For the seal member 81 provided in the lower surface 41*b* of the rotary disk 40, similarly, it is possible to avoid its leading end 81*a* from protruding into the fixed-disk port 70. Thus, the sealing performance of the seal member 81 can be ensured.

In the present example, furthermore, after executing the overrun control OC, the control unit 14 performs the return drive control RC to return the rotary disk 40 toward the predetermined stop angle θs.

Figure 13:
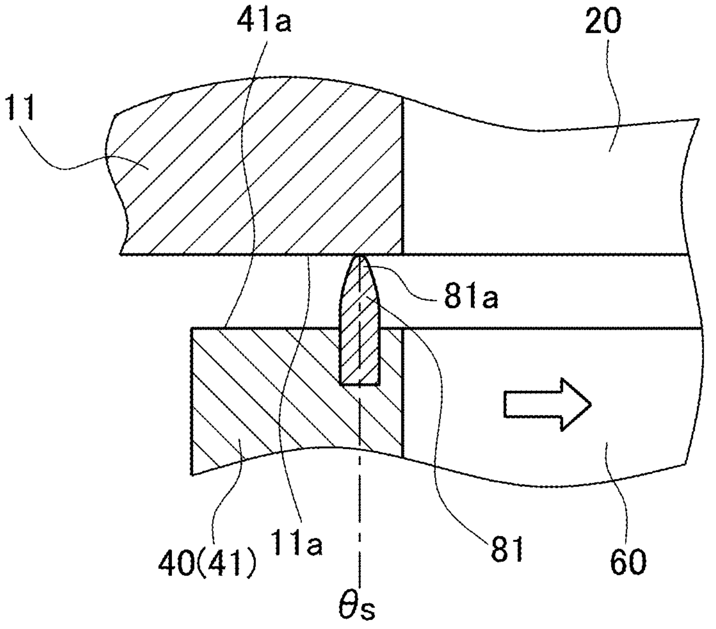
FIG. 13 is a cross-sectional view of the seal member and its surrounding after the return drive control is performed.

As described above, the control unit 14 reversely rotates the rotary disk 40 to return to the original predetermined stop angle θs as shown in FIG. 13.

Since the seal member 81 provided in the upper surface 41*a* of the rotary disk 40 is thus released from a deformed state, the local concentration of compressive stress and tensile stress and the change in surface pressure of the seal part can be reduced. The same applies to the seal member 81 provided in the lower surface 41*b* of the rotary disk 40. It is therefore possible to avoid that the collapse of the seal member 81 is hastened and the sealing performance becomes poor due to changes in surface pressure of the seal part.

Figure 26:
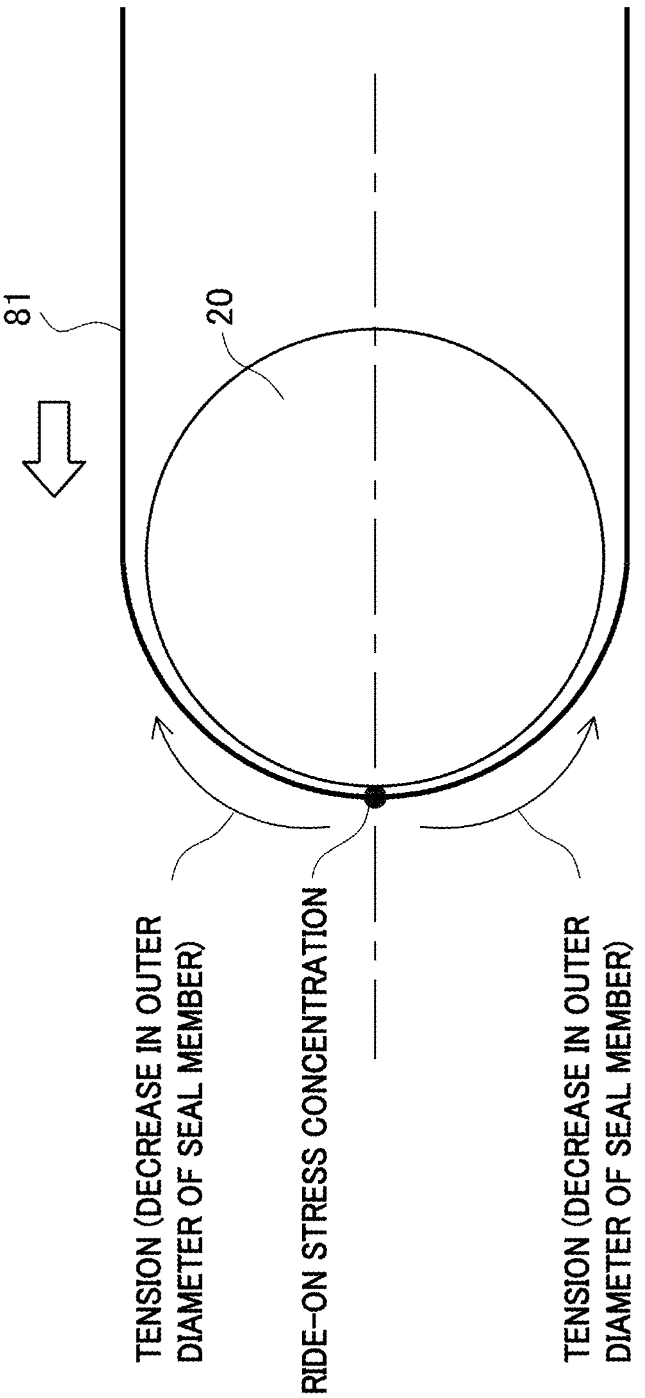
FIG. 26 is a diagram of a seal member and an inflow path when the inflow path is viewed from a rotary disk side, showing that ride-on stress concentration occurs when the overrun control is performed.
Figure 27:
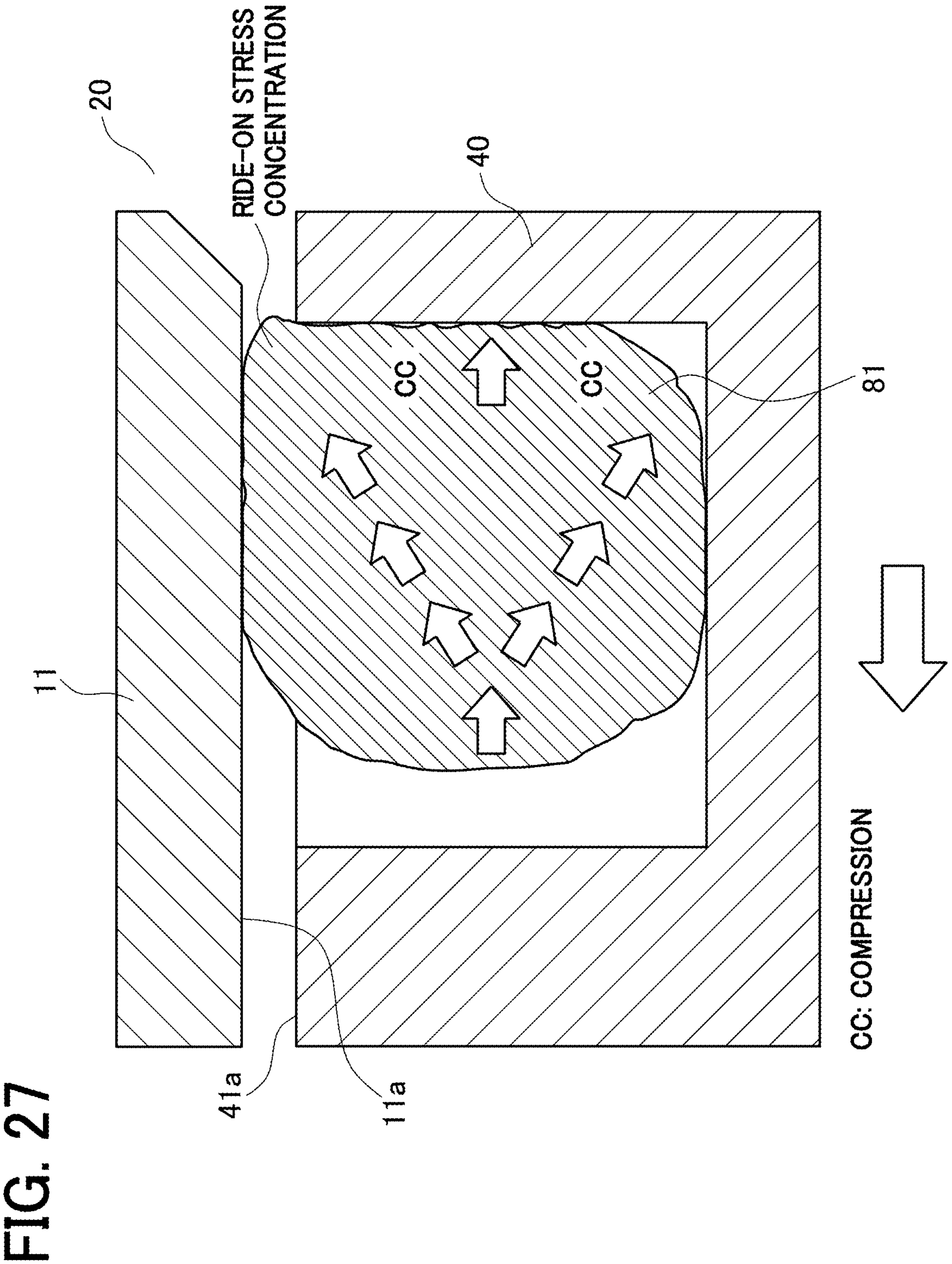
FIG. 27 is a cross-sectional view of the seal member and its surrounding, showing that that ride-on stress concentration occurs when the overrun control is performed.
Figure 28:
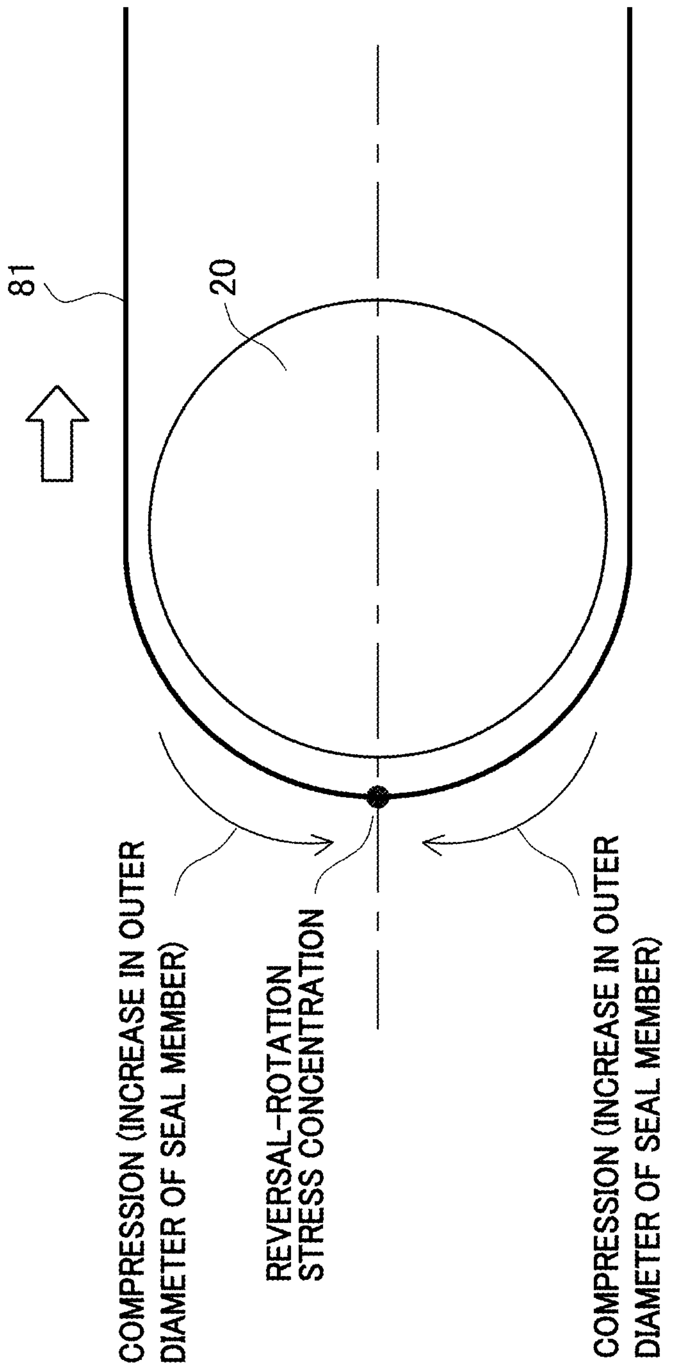
FIG. 28 is a diagram of a seal member and an inflow path when the inflow path is viewed from a rotary disk side, showing that reverse-rotation stress concentration occurs when the return drive control is performed.
Figure 29:
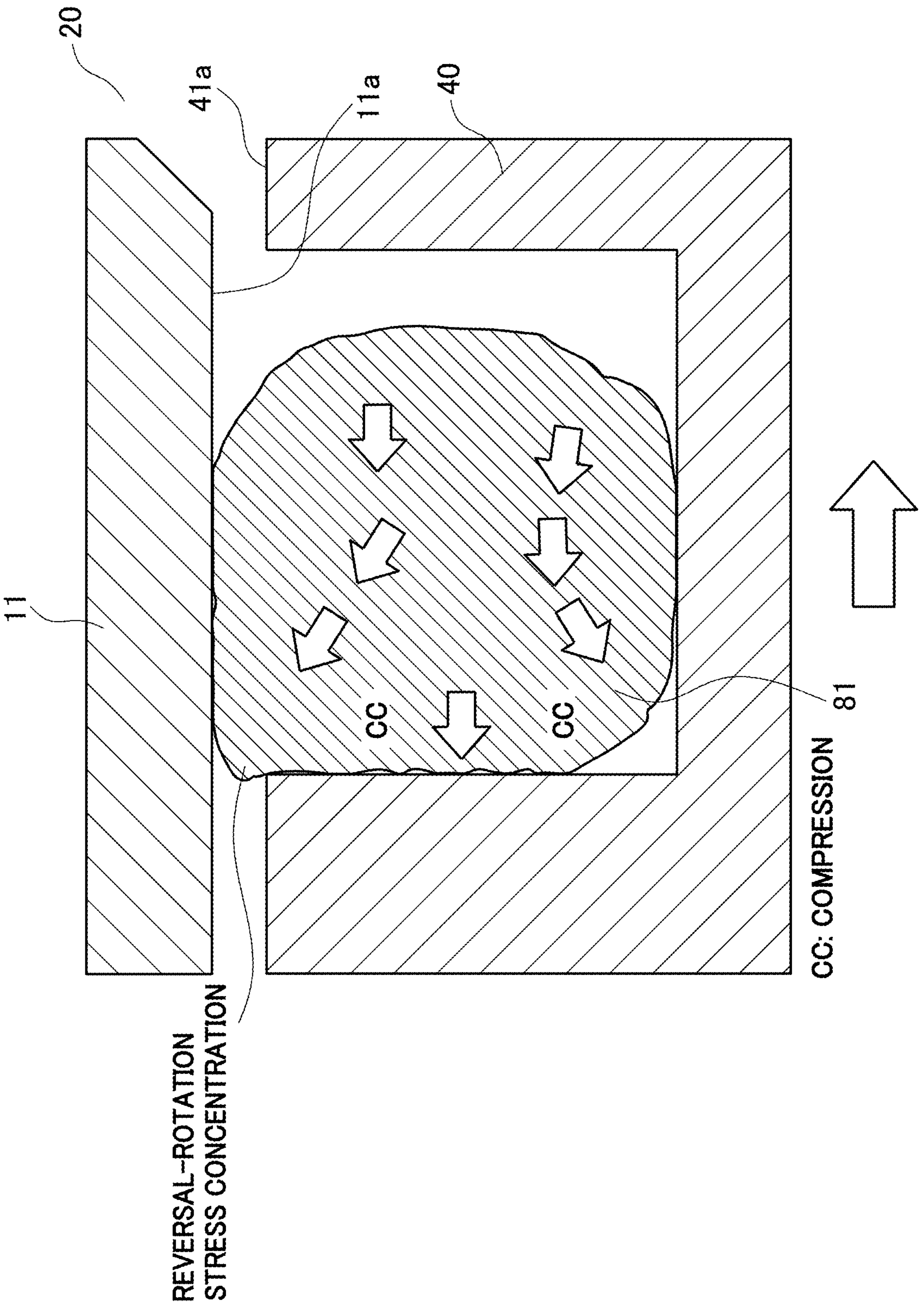
FIG. 29 is a cross-sectional view of the seal member and its surrounding, showing that the reverse-rotation stress concentration occurs when the return drive control is performed.

When the return drive control RC is performed after execution of the overrun control OC, a stress concentration site in the seal member 81 abruptly changes or shifts as shown in FIG. 26 to FIG. 29. FIG. 27 and FIG. 29 illustrate an example that the seal member 81 is an O-ring.

Specifically, as shown in FIG. 26 and FIG. 27, when the overrun control OC is performed, the stress concentration occurs in the seal member 81 due to the tensile stress generated when the seal member 81 moves from the flow path port of the inflow path 20 to ride on the inner surface 11*a* of the housing 11 (that is, "ride-on stress concentration" in the figures).

In contrast, as shown in FIG. 28 and FIG. 29, when the return drive control RC is performed, the stress concentration occurs in the seal member 81 due to the compressive stress generated by reverse rotation of the rotary disk 40 (that is, "reverse-rotation stress concentration" in the figures).

Thus, when the return drive control RC is performed after execution of the overrun control OC, the stress concentration site in the seal member 81 may change over in a state where the stress shift is not stable, resulting in the occurrence of peculiar stress concentration sites. This may deteriorate the sealing performance of the seal member 81. FIG. 26 to FIG. 29 illustrate the seal member 81 provided on the housing 11 side (i.e., on the inflow path 20 side), but the same applies to the seal member 81 provided on the fixed disk 50 side.

In the present example, therefore, the control unit 14 completes the overrun control OC by rotating the rotary disk 40 at the normal drive speed, and then performs the return drive control RC by rotating the rotary disk 40 at the low drive speed. Specifically, the control unit 14 sets the rotation speed of the rotary disk 40 in the return drive control RC to be slower than the rotation speed of the rotary disk 40 in the overrun control OC.

Consequently, when the return drive control RC is performed after execution of the overrun control OC, it is possible to prevent the stress concentration site in the seal member 81 from abruptly changing. Thus, the stress concentration site in the seal member 81 can be prevented from changing over while the stress shift is not stable, reducing the occurrence of peculiar stress concentration sites. Therefore, the sealing performance of the seal member 81 can be ensured.

Second Example

Next, a second example will be described, focusing on differences from the first example.

In the present example, the overrun drive angle $\alpha$ is an overrun drive angle kOR defined according to the water temperature Thw. Specifically, the control unit 14 performs the control shown in FIG. 14 and FIG. 15.

Figure 14:
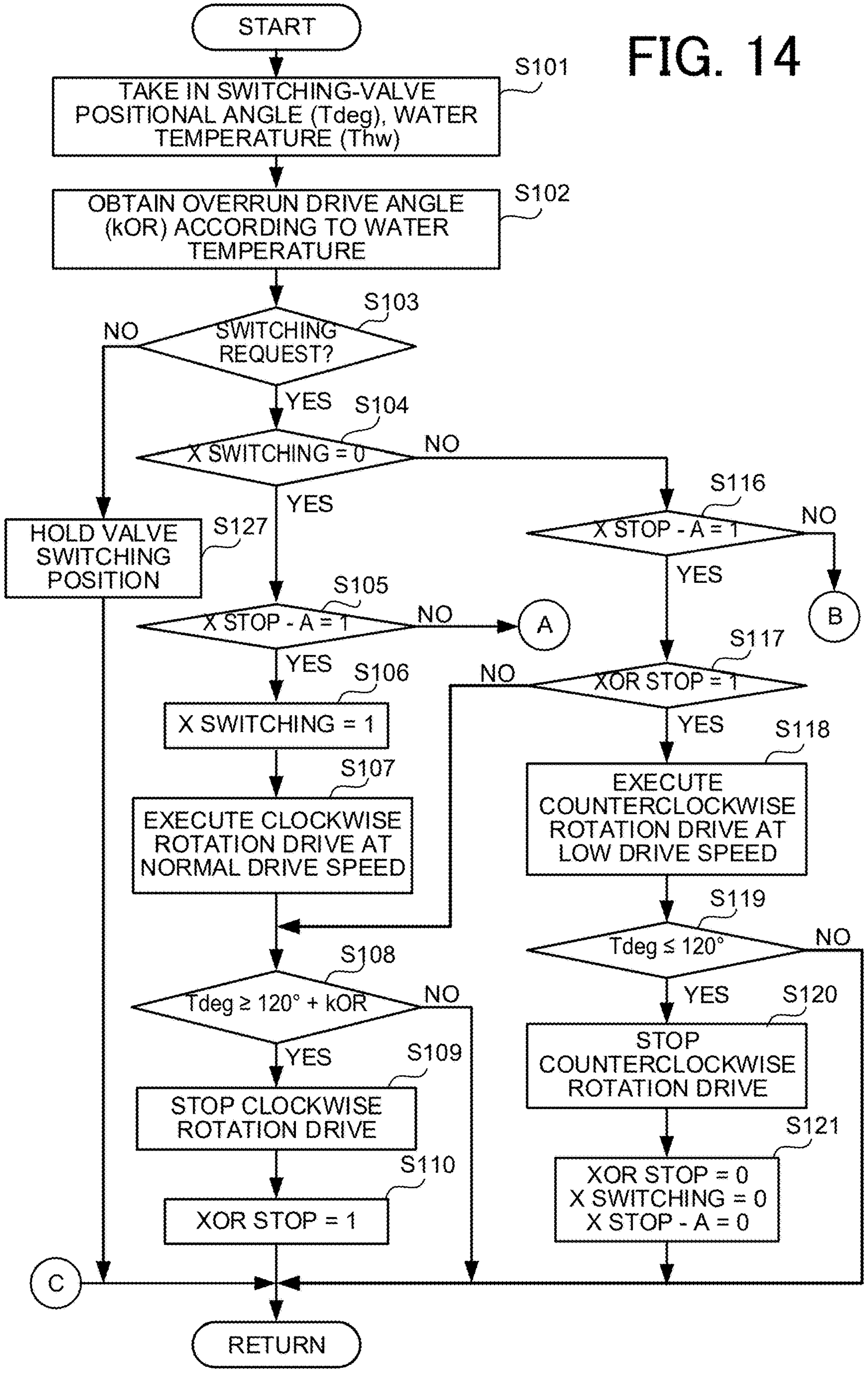
FIG. 14 is a flowchart showing control contents performed in a second example.
Figure 16:
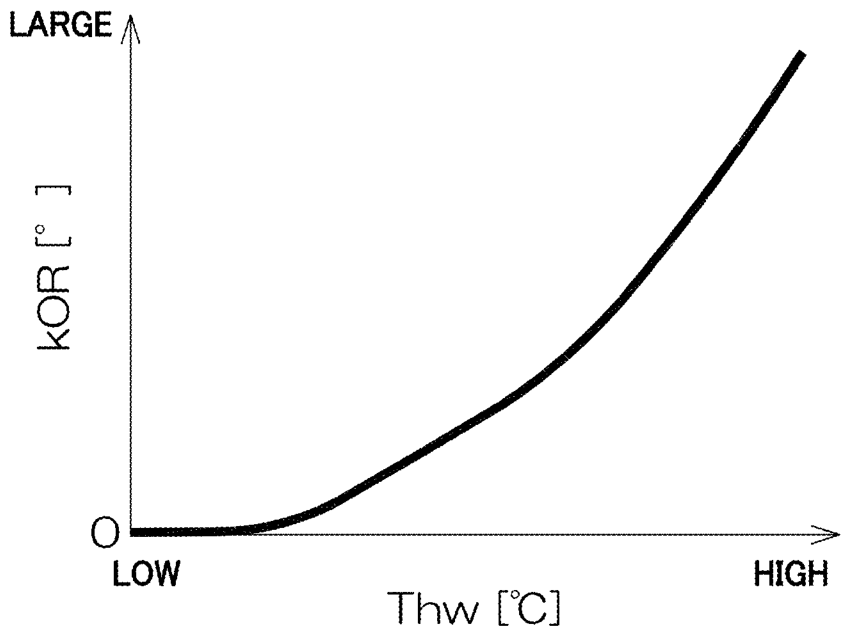
FIG. 16 is a graph showing a map that defines a relationship between water temperature and an overrun drive angle.

As shown in FIG. 14, before determining whether or not there is the switching request (Step S103), the control unit 14 takes in the switching-valve positional angle Tdeg and the water temperature Thw (Step S101). The control unit 14 then obtains the overrun drive angle kOR according to the water temperature Thw using the map of FIG. 16 (Step S102).

The water temperature Thw is the temperature of water that flows through the flow paths. A value of this water temperature Thw used herein is a detected value of a temperature sensor (not shown) provided in the flow path, an estimated value from the temperature of a target to be cooled (e.g., a battery) when the water flowing through the flow paths is cooling water, and so on.

When switching the flow path from the flow path pattern A to the flow path pattern B, if the switching-valve positional angle Tdeg is equal to or larger than (120°+kOR) in step S108 (Step S108: YES), the control unit 14 stops the clockwise rotation drive (Step S109). In this way, the control unit 14 further rotates the rotary disk 40 clockwise from the predetermined stop angle θs1 (e.g., 120°) to overrun by the overrun drive angle kOR, and completes the overrun control OC.

The control unit 14 executes the counterclockwise rotation drive at the low drive speed (Step S118). When the switching-valve positional angle Tdeg is equal to or less than 120° (Step S119: YES), the control unit 14 stops the counterclockwise rotation drive (Step S120). In this way, the control unit 14 rotates the rotary disk 40 counterclockwise at the low drive speed to return to the predetermined stop angle θs1 (e.g., 120°), and completes the return drive control RC.

When switching the flow path from the flow path pattern B to the flow path pattern A, if the switching-valve positional angle Tdeg is equal to or less than (60°−kOR) (Step S113: YES), the control unit 14 stops the counterclockwise rotation drive (Step S114). In this way, the control unit 14 further rotates the rotary disk 40 counterclockwise from a predetermined stop angle θs2 (e.g., 60°) to overrun by the overrun drive angle kOR, and completes the overrun control OC.

Then, the control unit 14 executes the clockwise rotation drive at the low drive speed (Step S123). When the switching-valve positional angle Tdeg is equal to or larger than 60° (Step S124: YES), the control unit 14 stops the clockwise rotation drive (Step S125). In this way, the control unit 14 rotates the rotary disk 40 clockwise to return to the predetermined stop angle θs2 (e.g., 60°), and completes the return drive control RC.

Figure 15:
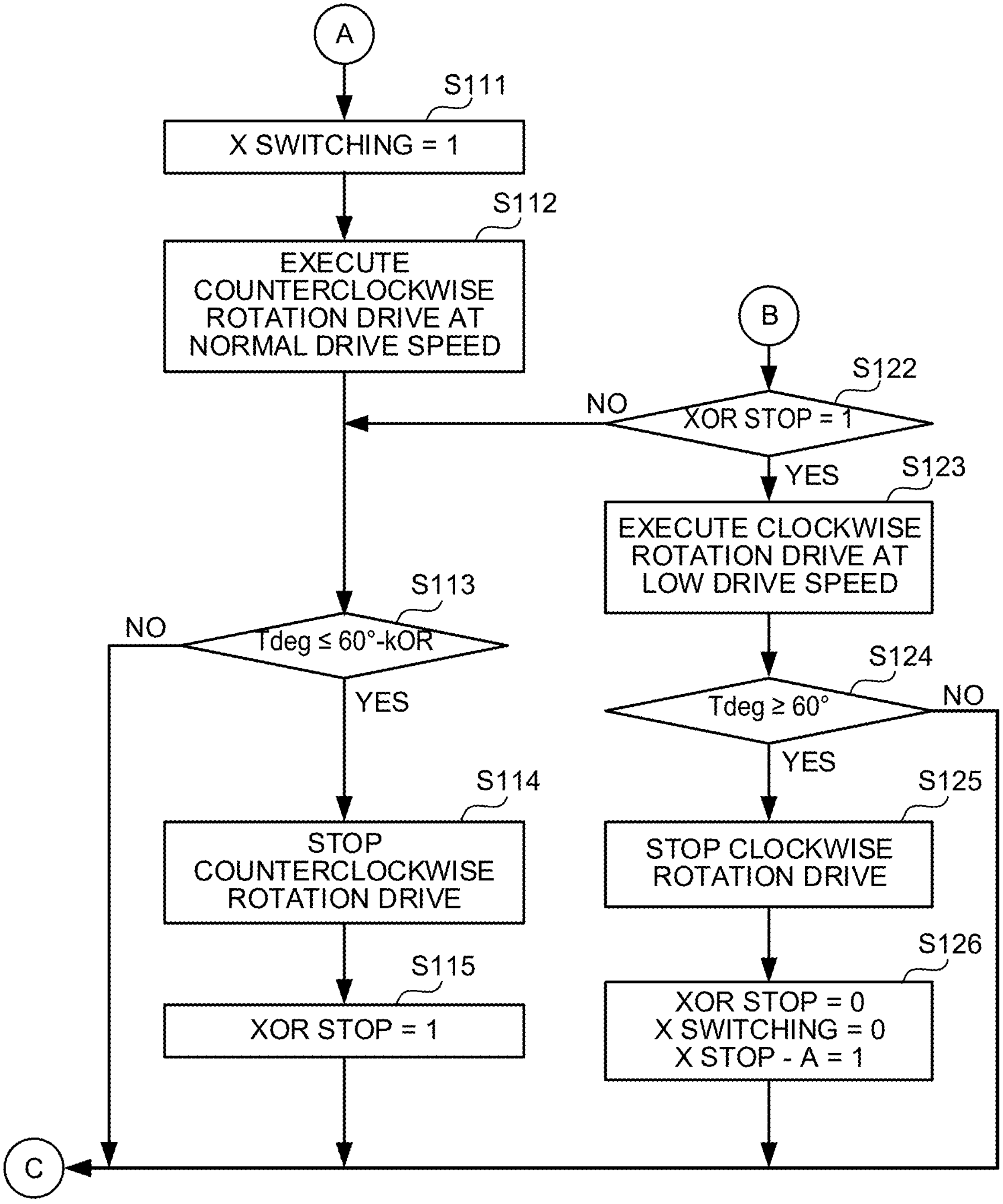
FIG. 15 is a flowchart showing the control contents performed in the second example.

Regarding the control shown in FIG. 14 and FIG. 15, the control contents other than the above are identical to those of the control shown in FIG. 8 and FIG. 9 and therefore their details are omitted.

Figure 17:
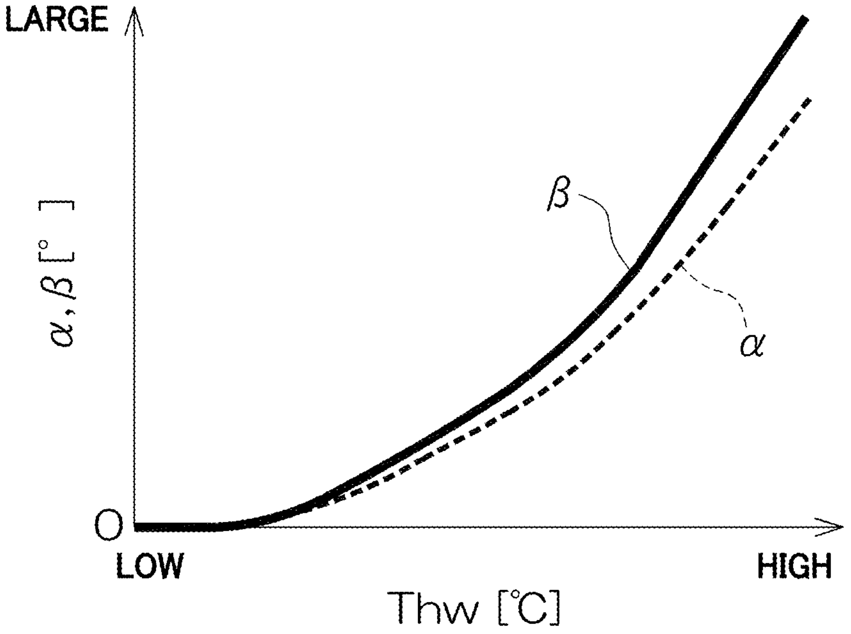
FIG. 17 is a graph showing a map that defines a relationship between water temperature and an overrun drive angle and a relationship between water temperature and a return drive angle.
Figure 18:
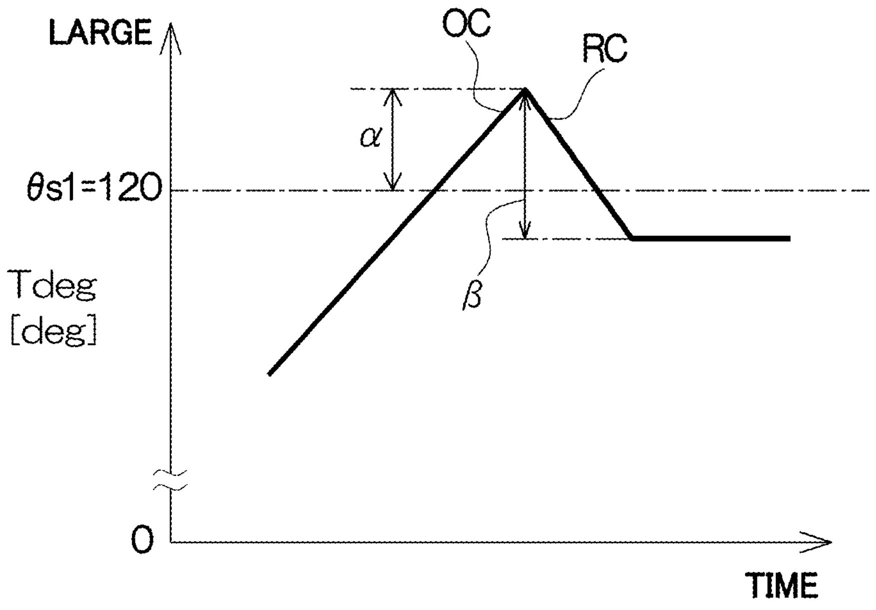
FIG. 18 is an enlarged diagram showing a return drive control of an overrun control in a time chart showing control contents using the map of FIG. 17.

The return drive angle $\beta$, which is the rotation angle of the rotary disk 40 in the return drive control RC, is set equal to the overrun drive angle $\alpha$ (or kOR) in the above, but may be set different from the overrun drive angle $\alpha$. As another example, they may be set such that the overrun drive angle $\alpha$<the return drive angle $\beta$ or the overrun drive angle $\alpha$>the return drive angle $\beta$. As a specific example, if the overrun drive angle $\alpha$<the return drive angle $\beta$ is set as shown in FIG. 17, the control represented by a time chart shown in FIG. 18 can be performed.

In the present example, as described above, the control unit 14 uses the overrun drive angle kOR to be changed according to the water temperature Thw, as the overrun drive angle $\alpha$ that is the rotation angle of the rotary disk 40 in the overrun control OC. In this manner, the control unit 14 changes the overrun drive angle $\alpha$ and the return drive angle $\beta$ according to the water temperature Thw. The rotation angle is one example of a "drive amount" of the disclosure.

Therefore, the leading end 81_a_ of the seal member 81 can be avoided from protruding into the inflow path 20 or the fixed-disk port 70 after completion of the flow path switching, even if the elastic state of the seal member 81 changes with the water temperature Thw. Thus, the sealing performance of the seal member 81 can be ensured.

As a modified example, the control unit 14 may repeat the overrun control OC and the return drive control RC multiple times when switching the flow path.

Figure 19:
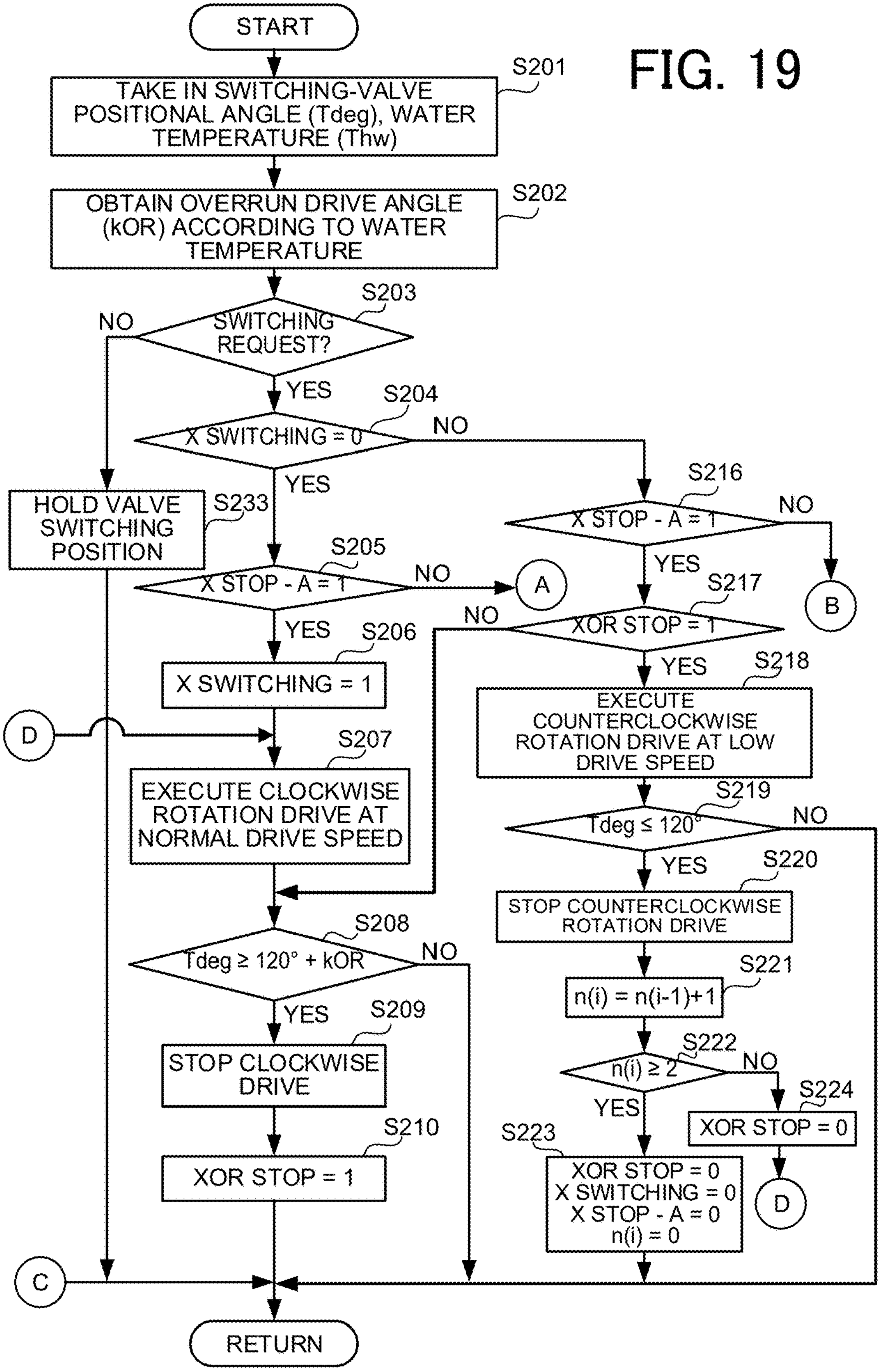
FIG. 19 is a flowchart showing control contents performed in a modified example of the second example.
Figure 20:
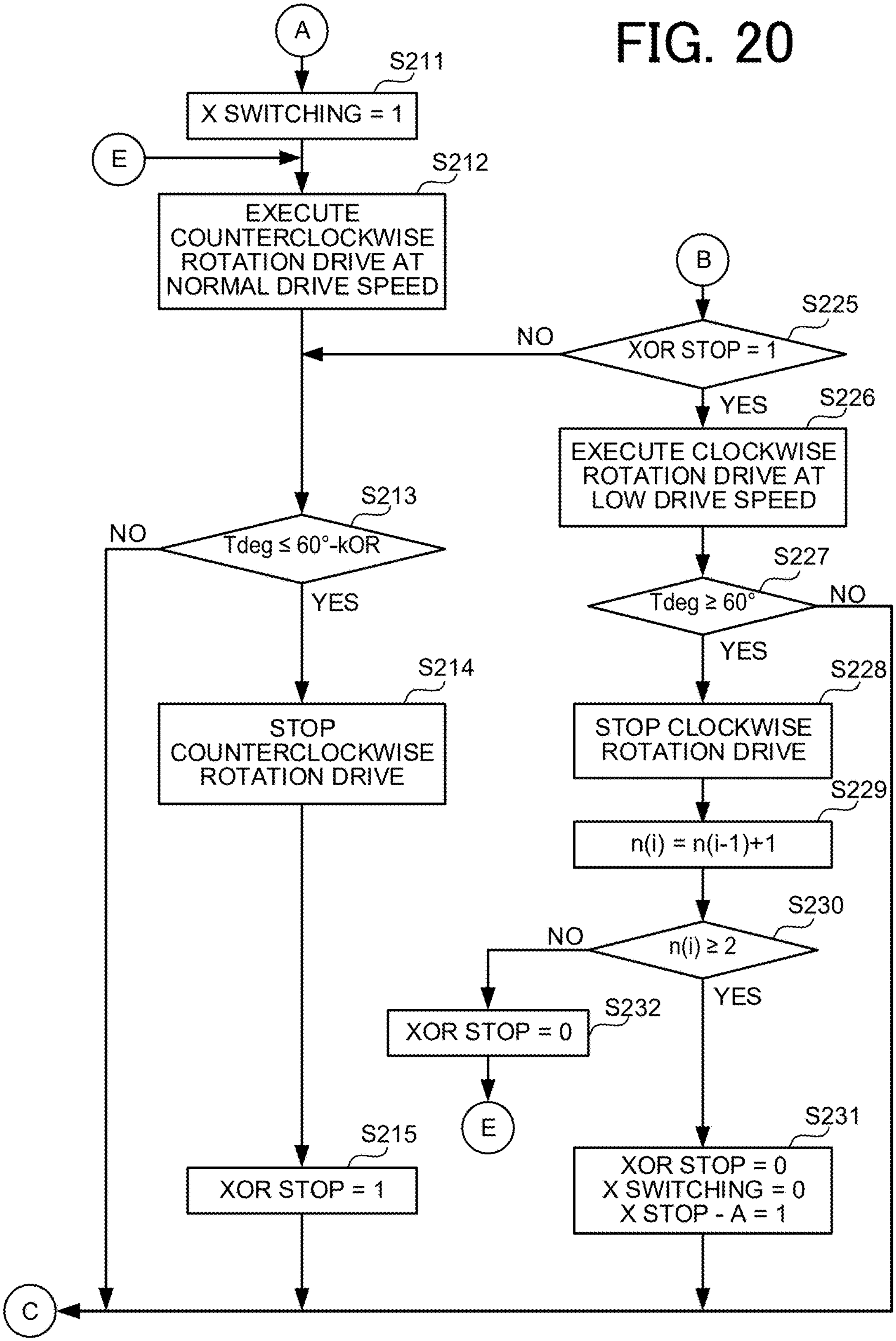
FIG. 20 is a flowchart showing the control contents performed in the modified example of the second example.

Specifically, the control unit 14 performs the control shown in FIG. 19 and FIG. 20. As shown in FIG. 19, when the switching-valve positional angle Tdeg is equal to or less than 120° in step S219 (Step S219: YES), the control unit 14 stops the counterclockwise rotation drive (Step S220) and then increments the counter value n(i) by one (Step S221). Further, if the counter value n(i) is less than 2 (Step S220: NO), the control unit 14 turns the OR stop flag to 0 (Step S224) and executes the clockwise rotation drive again at the normal drive speed (Step S207). In contrast, if the counter value n(i) is equal to or larger than 2 (Step S222: YES), the control unit 14 turns all of the OR stop flag, the switching flag, the "stop—A flag", and the counter value n(i) to 0 (Step S223).

As shown in FIG. 20, furthermore, when the switching-valve positional angle Tdeg is equal to or larger than 60° in step S227 (Step S227: YES), the control unit 14 stops the clockwise rotation drive (Step S228) and then increments the counter value n(i) by one (Step S229). If the counter value n(i) is less than 2 (Step S230: NO), the control unit 14 turns the OR stop flag to 0 (Step S232) and executes the counterclockwise rotation drive again at the normal drive speed (Step S212). In contrast, if the counter value n(i) is equal to or larger than 2 (Step S230: YES), the control unit 14 turns the OR stop flag and the switching flag to 0 and turns the "stop-A flag" to 1 (Step S231).

Regarding the control shown in FIG. 19 and FIG. 20, the control contents other than the above are identical to those of the control shown in FIG. 14 and FIG. 15 and thus their details are omitted.

Figure 21:
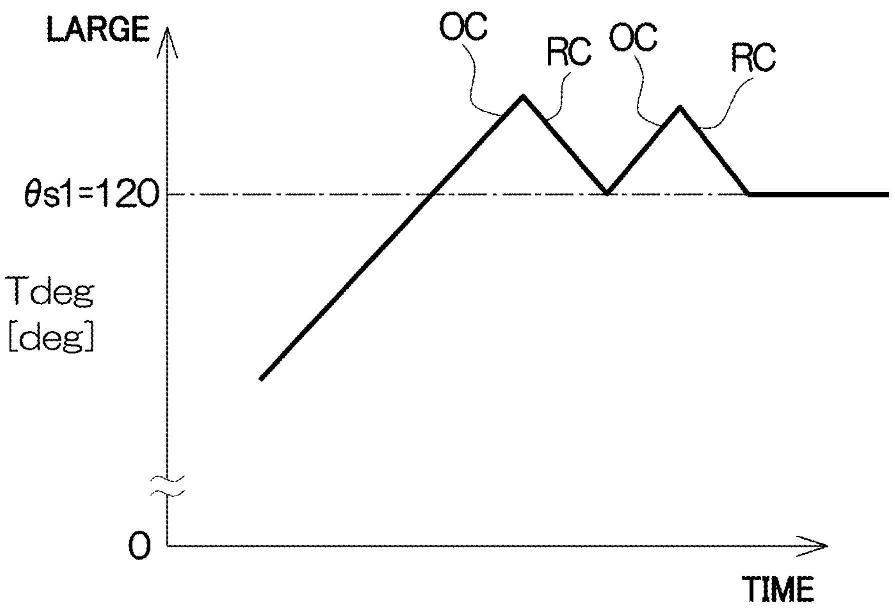
FIG. 21 is a time chart showing control contents performed in the modified example of the second example.
Figure 22:
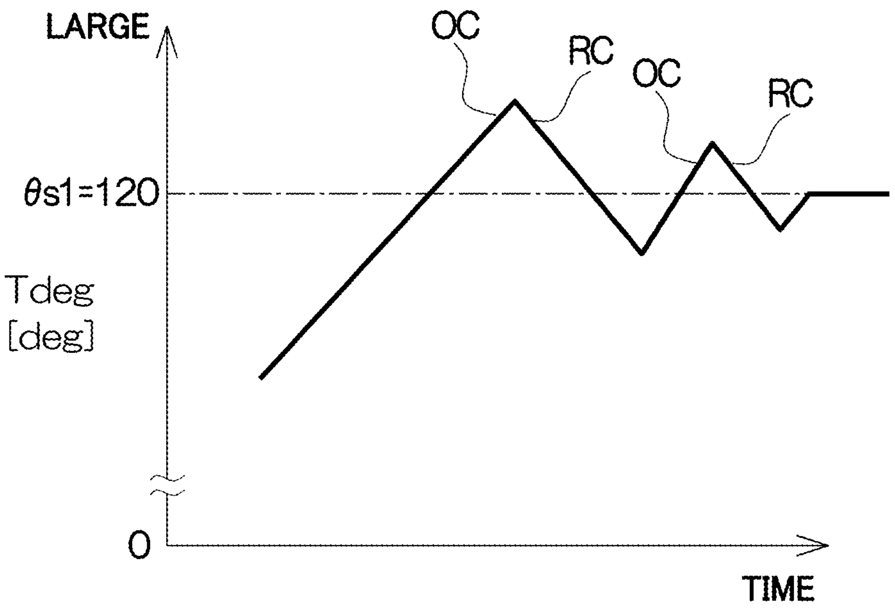
FIG. 22 is a time chart showing control contents performed in the modified example of the second example.

When the above-described control based on the flowcharts shown in FIG. 19 and FIG. 20 is executed, for example, the controls expressed by time charts shown in FIG. 21 or FIG. 22 are executed. Herein, FIG. 21 plots that the overrun drive angle $\alpha$ is set equal to the return drive angle β, and FIG. 22 plots that the overrun drive angle α is set different from the return drive angle β.

As described above, the control unit 14 may repeat the overrun control OC and the return drive control RC multiple times when switching the flow path.

Consequently, since the deformation of the seal member 81 is more effectively eliminated after completion of switching of a flow path, it is possible to reduce local concentration of compressive stress and tensile stress in the seal member 81 and reduce changes in surface pressure of the seal part. This can more effectively avoid that the collapse of the seal member 81 is hastened and the sealing performance becomes poor due to a surface pressure change of the seal part.

Third Example

The hardness of the seal member 81 increases under a low temperature environment. Accordingly, when the rotary disk 40 is rotated to switch the flow path, the followability of the seal member 81 with respect to the inner surface 11*a* of the housing 11 and the upper surface 51*a* of the fixed disk 50 decreases and the sealing performance of the seal member 81 deteriorates, causing fluid leakage. It is therefore desirable not to switch the flow path as little as possible under the low temperature environment.

In the present example, therefore, when a vehicle in which the flow path switching device 1 is mounted has an IG-OFF request (that is, a request to turn OFF an ignition switch (not shown)), the control unit 14 sets a flow path pattern requested in the low temperature environment. Thus, when the ignition switch is then turned ON and the vehicle equipped with the flow path switching device 1 is started in the low temperature environment, there is no need to switch the flow path.

Figure 23:
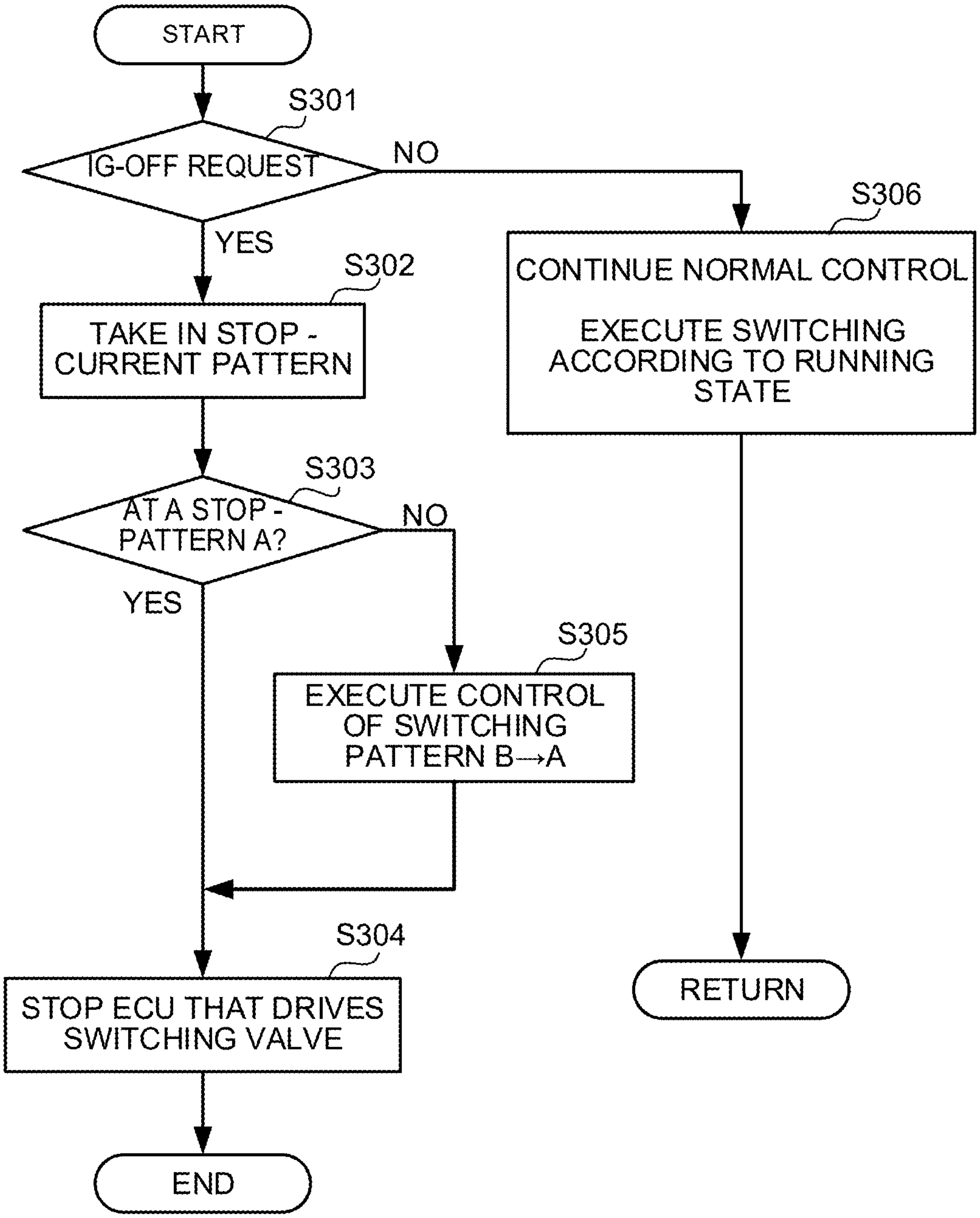
FIG. 23 is a flowchart showing control contents performed in a third example.

Specifically, the control unit 14 performs the control shown in FIG. 23. Here, the flow path pattern A is assumed to be a flow path pattern requested under a low temperature environment. As shown in FIG. 23, the control unit 14 determines whether or not there is the IG-OFF request (Step S301).

When there is the IG-OFF request (Step S301: YES), the control unit 14 takes in a "stop—current pattern" (Step S302). Here, the "stop—current pattern" is a current flow path pattern in which the rotary disk 40 is stopped.

Subsequently, the control unit 14 determines whether or not it is "at a stop—pattern A" (Step S303). Here, this "at a stop—pattern A" represents that the rotary disk 40 is stopped in the flow path pattern A.

When it is "at a stop—pattern A" (Step S303: YES), the control unit 14 "stops an ECU that drives a switching valve" (Step S304). Here, stopping the ECU driving the switching valve means stopping the control of the rotary disk 40.

In contrast, when the flow path pattern A is not established (Step S303: NO), that is, when the rotary disk 40 is stopped in the flow path pattern B, the control unit 14 executes the control of switching pattern B→A (Step S305) and stops the ECU driving the switching valve (Step S304). Here, the "control of switching pattern B→A" means the control to switch from the flow path pattern B to the flow path pattern A.

When there is no IG-OFF request (Step S301: NO) in step S301, the control unit 14 continues the normal control and executes the switching of flow path according to the running state of the vehicle equipped with the flow path switching device 1 (Step S306).

In the present example, as described above, when there is the IG-OFF request, the control unit 14 sets the flow path pattern, that is, the combination of the inflow path 20 and the fixed-disk port 70 with the rotary-disk communication path 60, to a requested state under the low temperature environment, and then stops the control of the rotary disk 40.

When turning OFF the ignition switch, as described above, the flow path pattern requested under the low temperature environment (e.g., the flow path pattern A or the flow path pattern B) is set in advance. When the IG-OFF request is then eliminated, that is, when the ignition switch is turned ON to start the vehicle equipped with the flow path switching device 1 under the low temperature environment, there is no need to switch the flow path under the low temperature environment. This can maintain the sealing performance of the seal member 81.

When turning the ignition switch OFF, if it is under a high temperature environment, a flow path pattern requested under the low temperature environment can be established in advance while the hardness of the seal members 81 is soft. Thus, the seal members 81 can follow the inner surface 11*a* of the housing 11 and the upper surface 51*a* of the fixed disk 50 to ensure the sealing performance of the seal members 81.

Not only when there is the IG-OFF request as a control stop request, but also when a request predicting that the rotary disk 40 will remain stopped for a predetermined period of time or longer (e.g., when a vehicle equipped with the flow path switching device 1 is parked), the control unit 14 may also set a flow path pattern to a state requested under the low temperature environment and then stops the control of the rotary disk 40.

The foregoing embodiments are mere examples and do not particularly limit the disclosure. The disclosure may be modified or changed in other specific forms without departing from the essential characteristics thereof.

For instance, the above-described contents of the disclosure can also be applied to a slide valve that switches between flow path patterns by sliding the slide valve by a drive shaft in an axis direction of the drive shaft and changing combinations of flow path ports of a housing and communication paths of the slide valve to be communicated with each other.

| REFERENCE SIGNS LIST | |
|---|---|
| 1 | Flow path switching device |
| 11 | Housing |
| 11a | Inner surface |
| 12 | Valve body unit |
| 13 | Drive unit |
| 14 | Control unit |
| 20 | Inflow path |
| 21 | First inflow path |
| 22 | Second inflow path |
| 23 | Third inflow path |
| 30 | Outflow path |
| 31 | First outflow path |
| 32 | Second outflow path |
| 33 | Third outflow path |
| 40 | Rotary disk |
| 41 | Circular plate part |
| 50 | Fixed disk |
| 51 | Circular plate part |
| 51a | Upper surface |
| 60 | Rotary-disk communication path |
| 61 | First rotary-disk communication path |
| 62 | Second rotary-disk communication path |
| 63 | Third rotary-disk communication path |
| 70 | Fixed-disk port |

-continued

| REFERENCE SIGNS LIST | |
|---|---|
| 71 | First fixed-disk port |
| 72 | Second fixed-disk port |
| 73 | Third fixed-disk port |
| 81 | Seal member |
| θs, θs1, θs2 | Predetermined stop angle |
| OC | Overrun control |
| RC | Return drive control |
| α, kOR | Overrun drive angle |
| β | Return drive angle |
| Thw | Water temperature |

The invention claimed is:

1. A flow path switching device comprising:

a fixed member; and a driven member, the flow path switching device being configured to switch between combinations of ports of the fixed member and communication paths of the driven member to be communicated by driving the driven member to switch a flow path, wherein the flow path switching device comprises:

a seal member provided around the communication paths of the driven member and protruding toward the fixed member to seal between the driven member and the fixed member; and a control unit that controls driving of the driven member, wherein, when switching the flow path, the control unit performs an additional drive control to further drive the driven member from a predetermined stop position after switching the flow path, and then performs a return drive control to return the driven member toward the predetermined stop position.

2. The flow path switching device of claim 1, wherein a drive amount of the driven member to perform the additional drive control and a drive amount of the driven member to perform the return drive control are changed according to a temperature of a fluid.

3. The flow path switching device of claim 1, wherein the control unit repeats the additional drive control and the return drive control multiple times to switch the flow path.

4. The flow path switching device of claim 1, wherein when there is a control stop request, the control unit sets the combination of the ports of the fixed member and the communication paths of the driven member to a state requested under a low temperature environment, and then stops controlling the driven member.

5. The flow path switching device of claim 2, wherein when there is a control stop request, the control unit sets the combination of the ports of the fixed member and the communication paths of the driven member to a state requested under a low temperature environment, and then stops controlling the driven member.

6. The flow path switching device of claim 3, wherein when there is a control stop request, the control unit sets the combination of the ports of the fixed member and the communication paths of the driven member to a state requested under a low temperature environment, and then stops controlling the driven member.

* * * * *